(12) United States Patent
Zhang et al.

(10) Patent No.: US 12,395,916 B1
(45) Date of Patent: Aug. 19, 2025

(54) CELL HANDOVER METHOD AND CELL HANDOVER DEVICE

(71) Applicant: SHANGHAI SATELLITE NETWORK RESEARCH INSTITUTE CO., LTD., Shanghai (CN)

(72) Inventors: Yueyue Zhang, Shanghai (CN); Xiaofan Xu, Shanghai (CN); Jianfei Tong, Shanghai (CN); Ping Du, Shanghai (CN); Hong Yan, Shanghai (CN); Zhiqiang Hu, Shanghai (CN)

(73) Assignee: Shanghai Satellite Network Research Institute Co., Ltd., Shanghai (CN)

( * ) Notice: Subject to any disclaimer, the term of this patent is extended or adjusted under 35 U.S.C. 154(b) by 0 days.

(21) Appl. No.: 19/187,915

(22) Filed: Apr. 23, 2025

Related U.S. Application Data

(63) Continuation of application No. PCT/CN2023/132042, filed on Nov. 16, 2023.

(51) Int. Cl.
    *H04W 4/00* (2018.01)
    *H04W 36/32* (2009.01)

(52) U.S. Cl.
    CPC .................... *H04W 36/322* (2023.05)

(58) Field of Classification Search
    CPC .................................. H04W 36/322
    USPC .......................................... 370/331
    See application file for complete search history.

(56) References Cited

U.S. PATENT DOCUMENTS

| | | | |
|---|---|---|---|
| 7,489,927 B2 * | 2/2009 | Dhillon | H04B 7/195 455/430 |
| 8,688,101 B1 * | 4/2014 | Hayes | H04W 4/40 455/448 |
| 9,692,468 B2 * | 6/2017 | Eskridge, Jr. | H04B 1/1036 |
| 10,447,321 B2 * | 10/2019 | Eskridge, Jr. | H04W 36/20 |
| 10,524,185 B2 * | 12/2019 | Kay | H04L 45/243 |
| 10,959,054 B2 * | 3/2021 | Hayes | H04W 4/027 |
| 11,230,379 B2 * | 1/2022 | Jackson | B64D 11/0015 |
| 11,388,587 B2 * | 7/2022 | Pilock | H04W 36/328 |
| 11,558,712 B2 * | 1/2023 | Hayes | H04W 4/027 |
| 11,700,308 B2 * | 7/2023 | Stone | H04L 67/142 709/219 |

(Continued)

FOREIGN PATENT DOCUMENTS

| | | |
|---|---|---|
| CN | 102026232 | 4/2011 |
| CN | 111010708 | 4/2020 |

(Continued)

OTHER PUBLICATIONS

"International Search Report (Form PCT/ISA/210) of PCT/CN2023/132042", mailed on Aug. 13, 2024, pp. 1-3.

*Primary Examiner* — Amancio Gonzalez
(74) *Attorney, Agent, or Firm* — JCIPRNET

(57) ABSTRACT

A cell handover method and a cell handover device are provided. The method includes: a first stereo cell where a spatial terminal is located is determined based on first position information where the spatial terminal is located; a second stereo cell to be switched for the spatial terminal is determined based on second position information where the spatial terminal is located after a time period and a cell handover strategy; and a handover message is sent to the spatial terminal to indicate the spatial terminal to switch from the first stereo cell to the second stereo cell.

20 Claims, 10 Drawing Sheets

(56) References Cited

U.S. PATENT DOCUMENTS

| | | | |
|---|---|---|---|
| 11,882,627 B2* | 1/2024 | Pilock | H04W 4/02 |
| 12,200,061 B2* | 1/2025 | Stone | H04L 67/12 |
| 2016/0349351 A1* | 12/2016 | Ludden | G01S 5/0294 |
| 2021/0006328 A1* | 1/2021 | Kim | H04W 72/23 |
| 2022/0224405 A1* | 7/2022 | Zhou | H04W 36/00837 |
| 2023/0308980 A1* | 9/2023 | Rune | H04B 7/18541 |
| 2023/0354438 A1* | 11/2023 | Wang | H04W 74/002 |

FOREIGN PATENT DOCUMENTS

| | | |
|---|---|---|
| CN | 113905420 | 1/2022 |
| CN | 114765812 | 7/2022 |

* cited by examiner

CELL HANDOVER METHOD AND CELL HANDOVER DEVICE

CROSS-REFERENCE TO RELATED APPLICATION

This application is a continuation of international application of PCT application serial no. PCT/CN 2023/132042, filed on Nov. 16, 2023. The entirety of the above-mentioned patent application is hereby incorporated by reference herein and made a part of this specification.

TECHNICAL FIELD

The present disclosure relates to the field of satellite Internet technology, and more particularly, to a cell handover method and a cell handover device.

BACKGROUND

With development of communication technology, terminal devices used by users gradually evolve from hand-held terminals, vehicle-mounted terminals and ship-borne terminals moving at low speed and in a small range on ground or on sea surface, to terminal forms such as unmanned aerial vehicle that has quick, large-scale motion ability in air and near-ground orbit aircraft. How to provide high-quality services for the terminal devices at any position in space such as the ground, the sea surface and the air to ensure communication reliability has become an urgent problem to be solved.

SUMMARY

Embodiments of the present disclosure provide a cell handover method and a cell handover device, which may at least solve a problem of how to provide a high-quality service and ensure communication reliability for a terminal device at any position in space such as ground, sea surface and air in the related art.

According to a first aspect of embodiments of the present disclosure, there is provided a cell handover method, applied to a first network device, including: determining a first stereo cell where a spatial terminal is located based on first position information where the spatial terminal is located; determining a second stereo cell to be switched for the spatial terminal based on second position information where the spatial terminal is located after a time period and a cell handover strategy; and sending a handover message to the spatial terminal to indicate the spatial terminal to switch from the first stereo cell to the second stereo cell.

In some embodiments, the method further includes: obtaining the first position information and motion state information from the spatial terminal; and determining the second position information based on the first position information and the motion state information.

In some embodiments, the first position information includes a first position coordinate in an earth coordinate system; the second position information includes a second position coordinate in the earth coordinate system; the second position information is obtained by converting a displacement of the spatial terminal in an inertial coordinate system after the time period based on a first transformation matrix from the inertial coordinate system to the earth coordinate system; the displacement is obtained based on a third position coordinate of the spatial terminal in the inertial coordinate system, a running speed and a triaxial acceleration; the triaxial acceleration and the running speed are obtained based on the motion state information; and the third position coordinate is obtained by converting the first position coordinate based on a second transformation matrix from the earth coordinate system to the inertial coordinate system.

In some embodiments, heights of the first stereo cell and the second stereo cell are different, and the handover message carries codeword information corresponding to the height where the second stereo cell is located to indicate the spatial terminal to perform cell handover based on the codeword information.

In some embodiments, a codeword corresponding to a height where the first stereo cell is located and a codeword corresponding to a height where the second stereo cell is located are mutually orthogonal or mutually quasi-orthogonal.

In some embodiments, the first stereo cell and the second stereo cell are covered by different beams, and the handover message carries relevant information about a beam covering the second stereo cell to indicate the spatial terminal to perform the cell handover based on the relevant information about the beam.

In some embodiments, the method further includes: sending a first handover negotiation message to a second network device in case that the second stereo cell is within a coverage range of the second network device, where the first handover negotiation message carries an identifier of the second stereo cell to indicate the second network device to reserve a service resource for the second stereo cell.

In some embodiments, the method further includes: reserving the service resource for the second stereo cell in case that the second stereo cell is within a coverage range of the first network device, and the first network device has a capability of providing the service resource for the second stereo cell.

In some embodiments, the method further includes: determining a third stereo cell to be switched for the spatial terminal in case that the second stereo cell is within the coverage range of the first network device, and the first network device does not have the capability of providing the service resource for the second stereo cell, where the third stereo cell is within a coverage range of a third network device; and sending a second handover negotiation message to the third network device, where the second handover negotiation message carries an identifier of the third stereo cell to indicate the third network device to reserve a service resource for the third stereo cell.

According to a second aspect of embodiments of the present disclosure, there is provided a cell handover method, applied to the spatial terminal, including: receiving the handover message from the network device; and switching from the first stereo cell where the spatial terminal is located to the second stereo cell based on the handover message; where the first stereo cell is determined by the network device based on the first position information where the spatial terminal is located, and the second stereo cell is determined by the network device based on the second position information where the spatial terminal is located after the time period and the cell handover strategy.

In some embodiments, the method further includes: sending the first position information to the network device.

In some embodiments, the method further includes: sending the first position information and the motion state information to the network device, where the first position information and the motion state information are configured to determine the second position information.

In some embodiments, the heights of the first stereo cell and the second stereo cell are different, and the handover message carries the codeword information corresponding to the height where the second stereo cell is located; and switching from the first stereo cell where the spatial terminal is located to the second stereo cell based on the handover message includes: switching from the first stereo cell to the second stereo cell based on the codeword information.

In some embodiments, the first stereo cell and the second stereo cell are covered by different beams, and the handover message carries the relevant information about the beam covering the second stereo cell; and switching from the first stereo cell where the spatial terminal is located to the second stereo cell based on the handover message includes: switching from the first stereo cell to the second stereo cell based on the relevant information about the beam.

According to a third aspect of embodiments of the present disclosure, there is provided a cell handover device, applied to the first network device, including: a processing module configured to determine the first stereo cell where the spatial terminal is located based on the first position information where the spatial terminal is located, and determine the second stereo cell to be switched for the spatial terminal based on second position information where the spatial terminal is located after the time period and the cell handover strategy; and a transceiver module configured to send the handover message to the spatial terminal to indicate the spatial terminal to switch from the first stereo cell to the second stereo cell.

According to a fourth aspect of embodiments of the present disclosure, there is provided a cell handover device, applied to the spatial terminal, including: a transceiver module configured to receive the handover message from the network device; and a processing module configured to switch from the first stereo cell where the spatial terminal is located to the second stereo cell based on the handover message; where the first stereo cell is determined by the network device based on the first position information where the spatial terminal is located, and the second stereo cell is determined by the network device based on the second position information where the spatial terminal is located after the time period and the cell handover strategy.

According to a fifth aspect of embodiments of the present disclosure, there is provided a network device, including: one or more processors; and one or more memories for storing instructions; where the processor is configured to invoke the instructions to enable the network device to perform the cell handover method as described in the first aspect and the alternative implementation of the first aspect.

According to a sixth aspect of embodiments of the present disclosure, there is provided a spatial terminal, including: one or more processors; and one or more memories for storing the instructions; where the processor is configured to invoke the instructions to enable the spatial terminal to perform the cell handover method as described in the second aspect and the alternative implementation of the second aspect.

According to a seventh aspect of embodiments of the present disclosure, there is provided a communication system, including the network device and the spatial terminal, where the network device is configured to implement the cell handover method as described in the first aspect and the alternative implementation of the first aspect, and the spatial terminal is configured to implement the random access method as described in the second aspect and the alternative implementation of the second aspect.

According to an eighth aspect of embodiments of the present disclosure, there is provided a storage medium storing the instructions that, when executed on a communication device, enable the communication device to perform the cell handover method as described in the first aspect and the alternative implementation of the first aspect, or to perform the cell handover method as described in the second aspect and the alternative implementation of the second aspect.

According to a ninth aspect of embodiments of the present disclosure, there is provided a program product that, when executed by the communication device, enables the communication device to perform the cell handover method as described in the first aspect or the second aspect, the alternative implementation of the first aspect or the alternative implementation of the second aspect.

According to a tenth aspect of embodiments of the present disclosure, there is provided a computer program that, when run on a computer, enables the computer to perform the cell handover method as described in the first aspect or the second aspect, the alternative implementation of the first aspect or the alternative implementation of the second aspect.

With solution provided by embodiments of the present disclosure, by dividing a service area of the network device into a three-dimensional stereo cell, the first stereo cell where the spatial terminal is located is determined based on the first position information where the spatial terminal is located, the second stereo cell to be switched for the spatial terminal is determined based on the second position information where the spatial terminal is located after the time period and the cell handover strategy, and the handover message is sent to the spatial terminal to indicate the spatial terminal to switch from the first stereo cell to the second stereo cell.

In this way, it may be achieved that the second stereo cell to be switched is predicted for the spatial terminal in advance before the spatial terminal moves out of the first stereo cell where the spatial terminal is located, so that the spatial terminal is switched to the second stereo cell in time, thereby ensuring continuity of service and reliability of communication and improving quality of service for the spatial terminal at any position in a three-dimensional space such as the ground, the sea surface or the air. Moreover, the second stereo cell to be switched is predicted based on the second position information where the spatial terminal is located after the time period by the first network device, which may avoid the spatial terminal sending a measurement report to the first network device, reduce time delay and improve accuracy of the determined second stereo cell.

BRIEF DESCRIPTION OF THE DRAWINGS

In order to more clearly illustrate the technical solutions in embodiments or the background art of the present disclosure, the drawings used in embodiments or the background art of the present disclosure will be described below.

DETAILED DESCRIPTION

Figure 1:
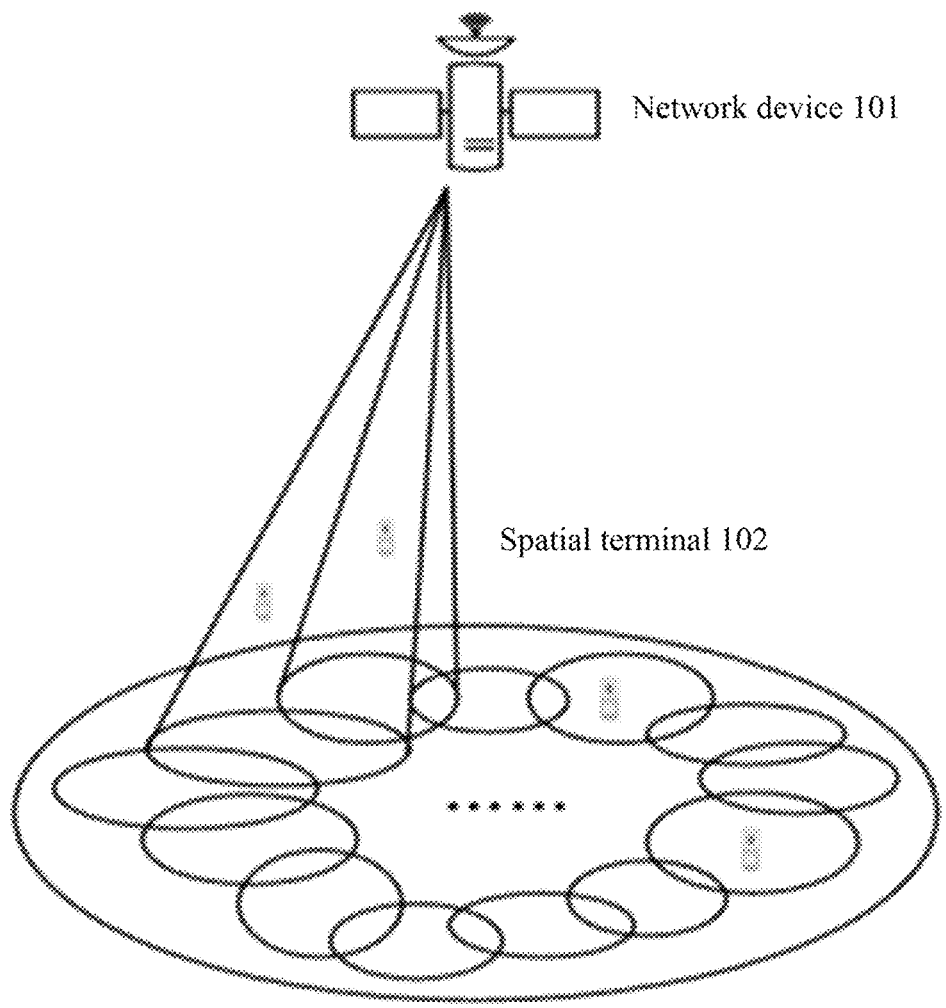
FIG. 1 is an architectural diagram illustrating a communication system according to embodiments of the present disclosure.

With development of communication technology, terminal devices used by users gradually evolves from hand-held terminals, vehicle-mounted terminals and ship-borne terminals moving at low speed and in a small range on ground or on sea surface, to terminal forms such as unmanned aerial vehicle that has quick, large-scale motion ability in air and near-ground orbit aircraft. In embodiments of the present disclosure, the terminal devices at any position in a three-dimensional space such as the ground, the sea surface or the air are collectively referred to as spatial terminals.

In related art, service area of network devices is generally divided into plane cell(s) on the ground to provide a service for the terminal devices. As the terminal devices used by the users gradually evolve to the spatial terminals located at any position in the three-dimensional space such as the ground, the sea surface or the air, how to provide a high-quality service for the spatial terminals and ensure communication reliability becomes an urgent problem to be solved.

Embodiments of the present disclosure provide a cell handover method, a cell handover device, a network device, a spatial terminal, a communication system, a storage medium, a program product and a computer program. By dividing the service area of the network devices into a three-dimensional stereo cell, a first stereo cell where the spatial terminal is located is determined based on first position information where the spatial terminal is located, a second stereo cell to be switched for the spatial terminal is determined based on second position information where the spatial terminal is located after a time period and a cell handover strategy, and a handover message is sent to the spatial terminal to indicate the spatial terminal to switch from the first stereo cell to the second stereo cell. In this way, it may be achieved that the second stereo cell to be switched is predicted for the spatial terminal in advance before the spatial terminal moves out of the first stereo cell where the spatial terminal is located, so that the spatial terminal is switched to the second stereo cell in time, thereby ensuring continuity of service and reliability of communication and improving quality of service for the spatial terminal at any position in the three-dimensional space such as the ground, the sea surface or the air. Moreover, the second stereo cell to be switched is predicted based on the second position information where the spatial terminal is located after the time period by the first network device, which may avoid the spatial terminal sending a measurement report to the first network device, reduce time delay and improve accuracy of the determined second stereo cell.

Furthermore, the cell handover method provided in embodiments of the present disclosure may be applied to a satellite communication system, which faces a multi-satellite operation and resource sharing scenario of different constellation systems, establishes a globally uniformly addressed stereo cell based on beam coverage characteristics of various satellites in various satellite systems, and realizes handover of the spatial terminal among different constellation systems, different satellites and different beams, to ensure the continuity of satellite communication service and the reliability of communication.

In order to better understand the cell handover method disclosed by embodiments of the present disclosure, the communication system to which embodiments of the present disclosure are applicable will first be described below.

FIG. 1 is an architectural diagram illustrating a communication system according to embodiments of the present disclosure. FIG. 1 is a schematic diagram illustrating the communication system as a satellite communication system and the network device as a satellite.

As shown in FIG. 1, the satellite communication system may include, but is not limited to, a network device 101 and a spatial terminal 102.

In some embodiments, the network device 101 is, for example, a node or device that accesses the terminal device to a wireless network. The network device may include at least one of the satellite, an evolved NodeB (eNB) in a 5G communication system, a next generation eNB (ng-eNB), a next generation NodeB (gNB), a nodeB (NB), a home nodeB (HNB), a home evolved nodeB (HeNB), a wireless backhaul device, a radio network controller (RNC), a base station controller (BSC), a base transceiver station (BTS), a base band unit (BBU), a mobile switching centre, a base station in a 6G communication system, an open ran, a cloud ran, a base station in another communication system, or an access node in a Wi-Fi system, but is not limited thereto.

In some embodiments, the spatial terminal 102 is a terminal device at any position in a space such as the ground, the ocean or the air, for example, including at least one of a mobile phone, a wearable device, an Internet of Things device, an automobile with a communication function, a smart automobile, an aircraft, a Pad, a computer with a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, or a wireless terminal device in a smart home, but not limited thereto.

It is understood that the communication system described in embodiments of the present disclosure is for a purpose of describing technical solutions of embodiments of the present disclosure more clearly, and does not constitute a limitation on the technical solutions provided by embodiments of the present disclosure. It is known to those skilled in the art that the technical solutions provided by embodiments of the present disclosure are equally applicable to similar technical problems as a system architecture evolves and new service scenarios emerge.

Embodiments of the present disclosure described below may be applied to, but are not limited to, the communication system or part of main bodies shown in FIG. 1. The main bodies shown in FIG. 1 are examples. The communication system may include all or some of the main bodies in FIG. 1, or may include other main bodies besides FIG. 1. The number and form of the main bodies are arbitrary, the main bodies may be physical or virtual, a connection relationship between the main bodies is an example, the main bodies may not be connected or may be connected, the connection may be in any manner, the connection may be a direct connection or an indirect connection, and the connection may be a wired connection or a wireless connection.

Hereinafter, the cell handover method provided by embodiments of the present disclosure will be described in detail.

First, the cell handover method applied to the first network device provided by embodiments of the present disclosure will be described. The first network device is a network device that provides the service to the spatial terminal.

Figure 2:
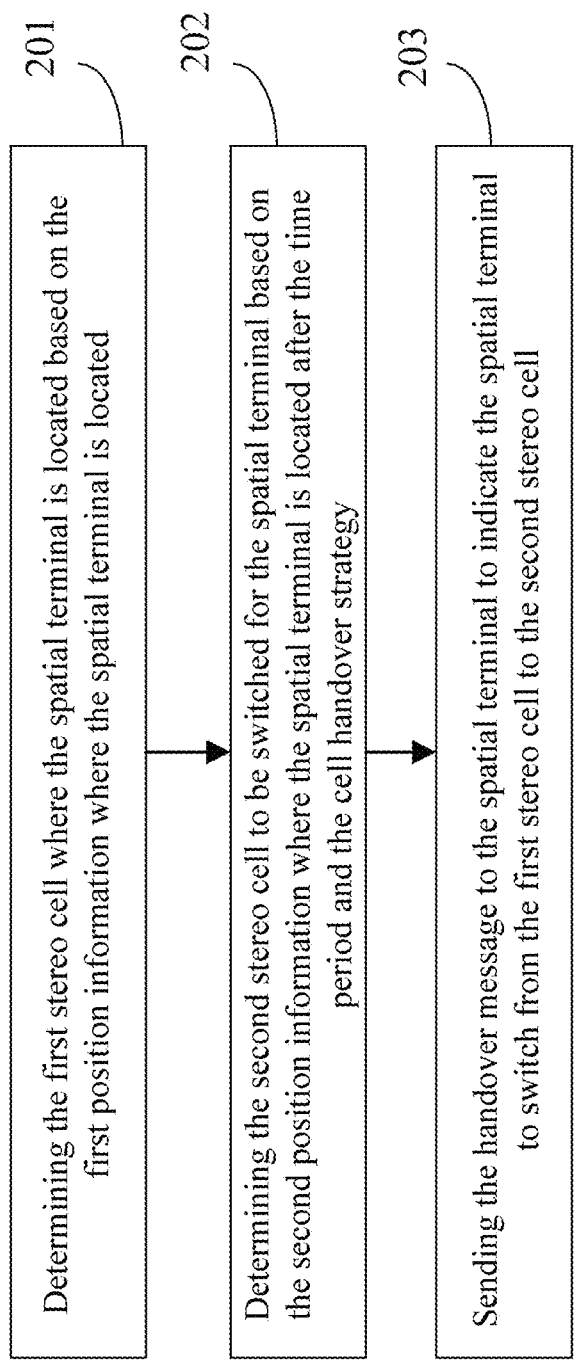
FIG. 2 is a flow diagram illustrating a cell handover method according to embodiments of the present disclosure.

FIG. 2 is a flow diagram illustrating a cell handover method according to embodiments of the present disclosure. As shown in FIG. 2, embodiments of the present disclosure relates to a method including the following steps 201-203.

In step 201, the first stereo cell where the spatial terminal is located is determined based on the first position information where the spatial terminal is located.

The first position information, which is information about a first position where the spatial terminal is located at a current moment, may include longitude information, latitude information, altitude information and the like.

In some embodiments, the first position information may be obtained by the spatial terminal and sent to the first network device.

In some embodiments, a navigation receiver module or a position sensor may be configured in the spatial terminal, and the spatial terminal may obtain the first position information where the spatial terminal is located in real time by the navigation receiver module or the position sensor, and then the first position information is sent to the first network device, so that the first network device may obtain the first position information.

In some embodiments, the three-dimensional space may be divided into the multiple stereo cells, a coverage area of each stereo cell includes a three-dimensional stereo area. A manner of dividing the three-dimensional space into the multiple stereo cells may be arranged as required, and the present disclosure is not limited thereto.

In some embodiments, multiple height ranges may be obtained by dividing in height dimension, and the multiple height ranges may be taken as a unified height reference. Based on the unified height reference, a three-dimensional stereo area covered by the same beam of the same network device in the same height range may be taken as the stereo cell.

A manner in which division is made in the height dimension to obtain the multiple height ranges may be predefined. For example, a customized setting may be performed in a manner of dividing a BeiDou grid location code according to a height hierarchy, or based on a type, a distribution characteristic and a traffic type of the spatial terminal of the communication system, and embodiments of the present disclosure are not limited thereto.

Figure 3:
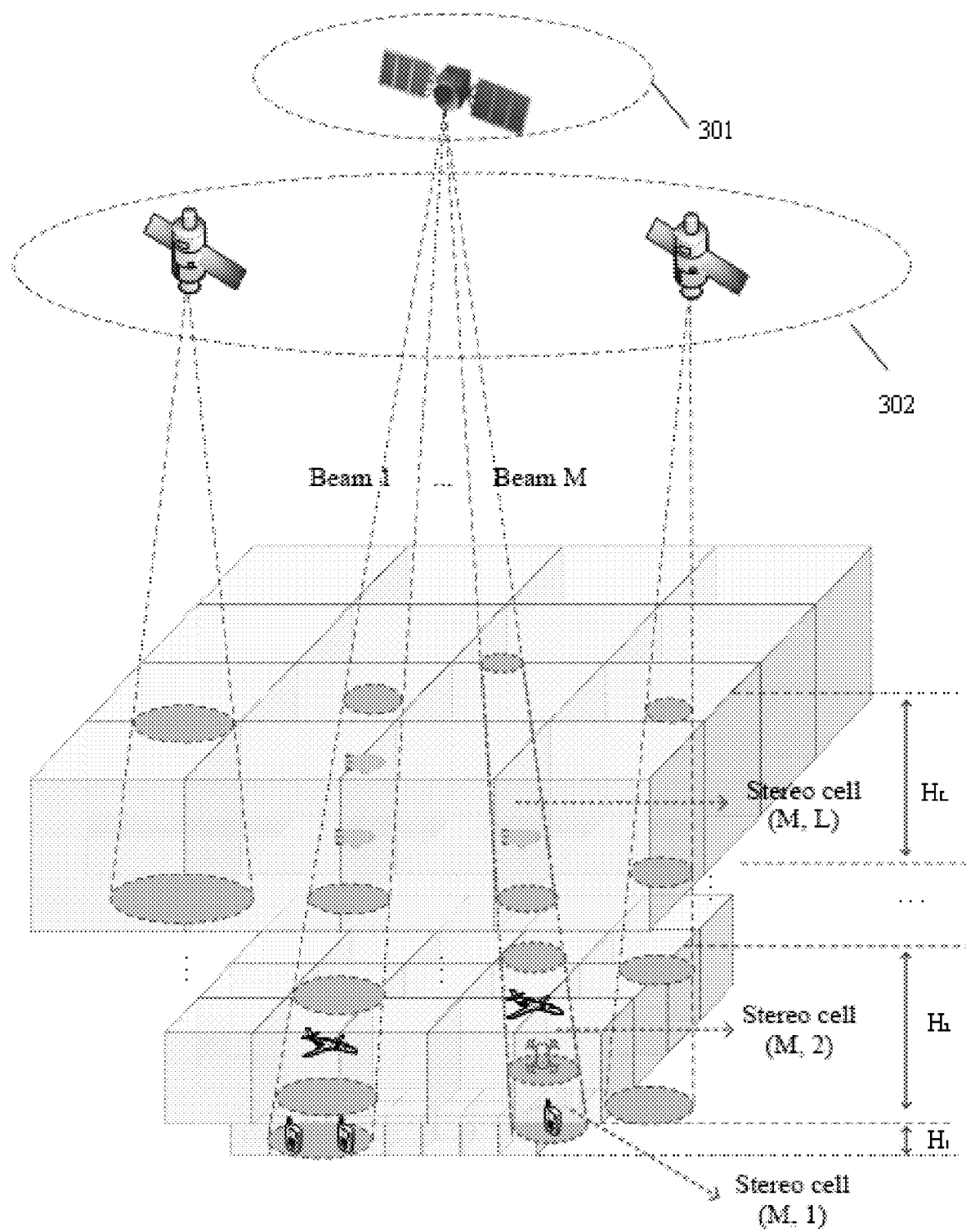
FIG. 3 is a schematic diagram illustrating a manner of dividing a stereo cell according to embodiments of the present disclosure.

With reference to a schematic diagram illustrating a manner of dividing the stereo cell shown in FIG. 3, taking the network device as the satellite as an example, the globally uniformly addressed stereo cell may be established.

Taking a satellite communication system including C constellation systems as an example, where $c^{th}$ constellation system includes $S_c$ satellites, $S_c^{th}$ satellite includes M beams, and the $S_c^{th}$ satellite serves N spatial terminals in total. C, $S_c$, M are integers greater than 0, N is an integer greater than or equal to 0, c is an integer between 1 and C (including 1 and C), and $S_c$ is an integer between 1 and $S_c$ (including 1 and $S_c$). In FIG. 3, the satellite communication system includes a satellite system 301 including one satellite including a beam 1, a beam 2 . . . a beam M and a satellite system 302 including two satellites each including one beam.

With reference to FIG. 3, with the Beidou grid location code as a reference, L height ranges may be obtained by dividing in the height dimension, namely $H_1$, $H_2$, . . . . $H_L$ in FIG. 3, where L is an integer greater than 1. Taking a set of L height ranges as a uniform altitude reference, and taking the reference as a basic condition, a coverage area of multiple satellites, multiple beams in multiple constellation systems may be divided into the multiple stereo cells. The three-dimensional stereo area covered by the same beam of the same satellite in the same height range is a stereo cell. For example, the beam M included in the satellite system 301 covers L stereo cells, where the L stereo cells are respectively in the L height ranges, and identities of the L stereo cells may be respectively: a stereo cell (M, 1), a stereo cell (M, 2), . . . a stereo cell (M, L). The stereo cell identified as (M, L) includes a three-dimensional stereo area covered by the $M^{th}$ beam at the Lth height range.

The first stereo cell is a stereo cell where the spatial terminal is located, which covers the first position where the spatial terminal is located, and the first stereo cell is served by the first network device.

In step 202, the second stereo cell to be switched for the spatial terminal is determined based on the second position information where the spatial terminal is located after the time period and the cell handover strategy.

The time period may be arranged as required, and the present disclosure is not limited thereto.

The second position information is information about a second position where the spatial terminal is located after the time period, and may include the longitude information, the latitude information, the height information and the like.

In some embodiments, the spatial terminal may predict the second position after the time period by itself, and send the information about the second location, namely, the second position information, to the first network device, so that the first network device may obtain the second position information.

The second stereo cell is a stereo cell into which the predicted spatial terminal enters after the time period. The number of the second stereo cells may be one or more, and the present disclosure is not limited thereto. Any second stereo cell may be served by the first network device or by other network devices.

The cell handover strategy is a strategy for determining the second stereo cell from the multiple stereo cells, and may be arranged as required. The present disclosure is not limited thereto.

In some embodiments, the cell handover strategy may include: determining a stereo cell covering the second position as the second stereo cell. Step 202 may then be implemented by: determining the stereo cell covering the second position from the multiple stereo cells based on the second position information where the spatial terminal is located after the time period, and determining the stereo cell covering the second position as the second stereo cell.

In some embodiments, the cell handover strategy may include: determining a stereo cell having a distance from the second position lower than a preset distance threshold value as the second stereo cell. Step 202 may then be implemented by: determining the stereo cell having the distance from the second position lower than the preset distance threshold value from the multiple stereo cells based on the second position information where the spatial terminal is located after the time period, and determining the stereo cell as the second stereo cell.

In some embodiments, the cell handover strategy may include: determining a stereo cell having a signal intensity higher than a preset signal intensity threshold value among candidate stereo cells as the second stereo cell, where the candidate stereo cell is a stereo cell having the distance from the second position lower than the preset distance threshold value. Step 202 may then be implemented by: determining a candidate stereo cell having the distance from the second position lower than the preset distance threshold value from the multiple stereo cells based on the second position information where the spatial terminal is located after the time period, and determining the stereo cell having the signal intensity higher than the preset signal intensity threshold value among the candidate stereo cells as the second stereo cell.

In some embodiments, the cell handover strategy may include: determining a stereo cell having a difference value between corresponding frequency of the first stereo cell and that of the stereo cell lower than a preset frequency threshold value among the candidate stereo cells as the second stereo cell, where the candidate stereo cell is the stereo cell having the distance from the second position lower than the preset distance threshold value. Step 202 may then be implemented by: determining the candidate stereo cell having the distance from the second position lower than the preset distance threshold value from the multiple stereo cells based on the second position information where the spatial terminal is located after the time period, and determining the stereo cell having the difference value between corresponding frequency of the first stereo cell and that of the stereo cell lower than the preset frequency threshold value among the candidate stereo cells as the second stereo cell.

It should be noted that the above-mentioned several cell handover strategies are merely illustrative and may not be understood as limiting the cell handover strategy. Those skilled in the art may arbitrarily arrange the cell handover strategy according to actual needs in practical applications, and embodiments of the present disclosure are not limited thereto.

It is understood that a user link between the spatial terminal and the network device such as the satellite has a large space-time scale characteristic, resulting in an increase in signaling transmission delay in a handover flow and easy to cause interruption of data transmission. In this way, in a case of performing cell handover, a method for sending the measurement report to the network device by the spatial terminal has a large time delay, which reduces performance of mobility management. However, with the cell handover method of embodiments of the present disclosure, the first network device predicts the second stereo cell to be switched based on the second position information where the spatial terminal is located after the time period, which avoids the spatial terminal sending the measurement report to the first network device, reduces the time delay and improves the accuracy of the determined second stereo cell.

It should be noted that step 201 and step 202 may be executed simultaneously or sequentially, and the present disclosure does not limit execution timing of steps 201 and 202.

In step 203, the handover message is sent to the spatial terminal to indicate the spatial terminal to switch from the first stereo cell to the second stereo cell.

In some embodiments, in a case where the second stereo cell is a different stereo cell than the first stereo cell, the first network device may send the handover message to the spatial terminal. The handover message indicates the spatial terminal to switch from the first stereo cell to the second stereo cell based on the handover message.

Accordingly, with the cell handover method provided by embodiments of the present disclosure, by dividing the service area of the network device into the three-dimensional stereo cell, the first stereo cell where the spatial terminal is located is determined based on the first position information where the spatial terminal is located, the second stereo cell to be switched for the spatial terminal is determined based on the second position information where the spatial terminal is located after the time period and the cell handover strategy, and the handover message is sent to the spatial terminal to indicate the spatial terminal to switch from the first stereo cell to the second stereo cell. In this way, it may be achieved that the second stereo cell to be switched is predicted for the spatial terminal in advance before the spatial terminal moves out of the first stereo cell where the spatial terminal is located, so that the spatial terminal is switched to the second stereo cell in time, thereby ensuring the continuity of service and the reliability of communication and improving quality of service for the spatial terminal at any position in the three-dimensional space such as the ground, the sea surface or the air. Moreover, the second stereo cell to be switched is predicted based on the second position information where the spatial terminal is located after the time period by the first network device, which may avoid the spatial terminal sending the measurement report to the first network device, reduce the time delay and improve the accuracy of the determined second stereo cell.

Furthermore, the cell handover method provided in embodiments of the present disclosure may be applied to the satellite communication system, which faces the multi-satellite operation and resource sharing scenario of different constellation systems, establishes the globally uniformly addressed stereo cell based on the beam coverage characteristics of various satellites in various satellite systems, and realizes the handover of the spatial terminal among different constellation systems, different satellites and different beams, to ensure the continuity of the satellite communication service and the reliability of the communication.

Figure 4:
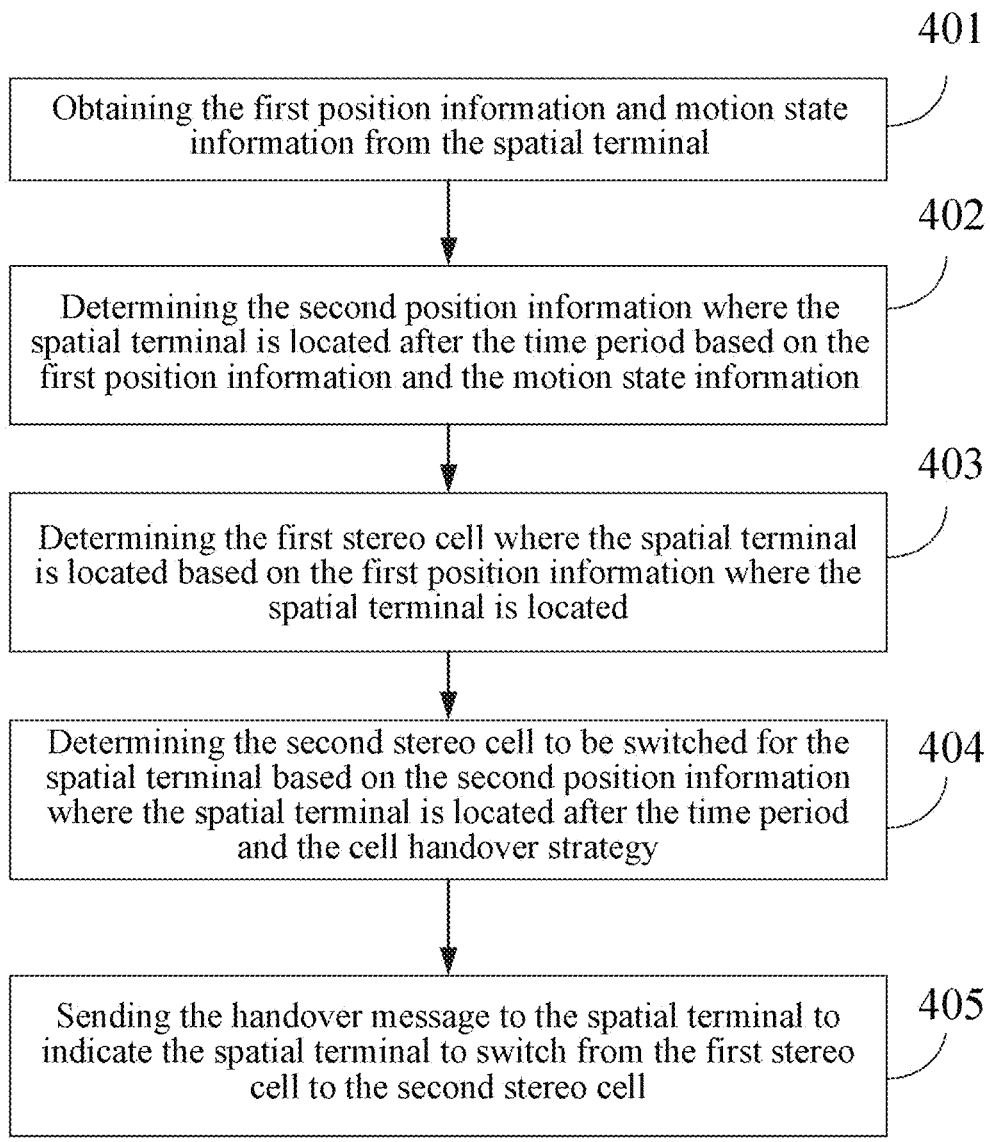
FIG. 4 is a flow diagram illustrating a cell handover method according to embodiments of the present disclosure.

FIG. 4 is a flow diagram illustrating a cell handover method according to embodiments of the present disclosure.

The cell handover method is applied to the first network device. The first network device is the network device that provides service for the spatial terminal.

As shown in FIG. 4, embodiments of the present disclosure relate to a method including the following steps 401-405.

In step 401, the first position information and motion state information are obtained from the spatial terminal.

The first position information, which is the information about the first position where the spatial terminal is located at the current moment, may include the longitude information, the latitude information, the altitude information and the like.

The motion state information may include information indicating a motion state of the spatial terminal, such as a motion vector of the spatial terminal at any time, a running speed of the spatial terminal at current time and the like.

In some embodiments, the spatial terminal may be equipped with an inertial navigation sensor through which the spatial terminal may obtain the motion vector at any time. The motion vector may include information such as triaxial acceleration, a course angle, a pitch angle, a roll angle and the like.

In step 402, the second position information where the spatial terminal is located after the time period is determined based on the first position information and the motion state information.

The time period may be arranged as required, and the present disclosure is not limited thereto.

The second position information is the information about the second position where the spatial terminal is located after the time period, and may include the longitude information, the latitude information, the height information and the like.

In some embodiments, the first position information includes a first position coordinate in an earth coordinate system, and the second position information includes a second position coordinate in the earth coordinate system. Step 402 may be realized in the following manner as shown in steps a, b, c and d.

Step a, a third position coordinate of the spatial terminal in an inertial coordinate system is obtained by converting the first position coordinate based on a second transformation matrix from the earth coordinate system to the inertial coordinate system.

The first position coordinate is a coordinate of the first position where the spatial terminal is located at the current moment.

$t_0$ represents the current moment, and $p_{n,0}$ represents the first position coordinate, wherein $p_{n,0}=\{\lambda_{n,0}, \phi_{n,0}, h_{n,0}\}$, where $\lambda_{n,0}$ represents a longitude value where the spatial terminal is located, $\phi_{n,0}$ represents a latitude value where the spatial terminal is located, and $h_{n,0}$ represents a height value of the spatial terminal from the ground.

A spatial Cartesian coordinate of the spatial terminal in the earth coordinate system is then of a form shown in the following formula (1):

$$p_{n,0}^e = \begin{bmatrix} x_{n,0}^e \\ y_{n,0}^e \\ z_{n,0}^e \end{bmatrix} = \begin{bmatrix} (R_n + h_{n,0})\cos\phi_{n,0}\cos\lambda_{n,0} \\ (R_n + h_{n,0})\cos\phi_{n,0}\sin\lambda_{n,0} \\ [R_n(1-e^2) + h_{n,0}]\sin\phi_{n,0} \end{bmatrix} \quad (1)$$

where e represents earth flattening, and $R_n$ represents radius of curvature in a normal section perpendicular to a meridian plane.

The third position coordinate of the spatial terminal in the inertial coordinate system is obtained by converting the first position coordinate based on the second transformation matrix from the earth coordinate system to the inertial coordinate system in a manner shown in the following formula (2):

$$p_{n,0}^i = C^{ie} p_{n,0}^e \quad (2)$$

where $C^{ie}$ represents a transformation matrix from the earth coordinate system to the inertial coordinate system, and for convenience of distinction, the transformation matrix is referred to as the second transformation matrix; $p_{n,0}^i$ represents the third position coordinate of the spatial terminal in the inertial coordinate system.

Step b, the triaxial acceleration and the running speed of the spatial terminal in the inertial coordinate system are obtained based on the motion state information.

In some embodiments, the motion state information may include the information indicating the motion state of the spatial terminal, such as the motion vector of the spatial terminal at any time, the running speed of the spatial terminal at the current time and the like. The motion vector may include the information such as the triaxial acceleration, the course angle, the pitch angle, the roll angle and the like. The running speed at the current moment in the motion state information may be the running speed of the spatial terminal in the inertial coordinate system.

t represents any moment, and $v_{n,t}$ represents the motion vector of the spatial terminal n in a carrier coordinate system at moment t, wherein $v_{n,t}=\{a_{n,t}, \alpha_{n,t}, \beta_{n,t}, \gamma_{n,t}\}$, Where $a_{n,t}$ represents the triaxial acceleration of the spatial terminal n at the moment t, $\alpha_{n,t}$ represents the course angle of the spatial terminal n at the moment t, $\beta_{n,t}$ represents the pitch angle of the spatial terminal n at the moment t, and $\gamma_{n,t}$ represents the roll angle of the spatial terminal n at the moment t.

Then, the triaxial acceleration $a_{n,t}^i$ of the spatial terminal n in the inertial coordinate system at the moment t may be obtained by processing $a_{n,t}$ as shown in the following formula (3):

$$a_{n,t}^i = C^{ib} a_{n,t} \quad (3)$$

where $C^{ib}$ represents the transformation matrix from the carrier coordinate system to the inertial coordinate system.

In some embodiments, $C^{ib}$ may be obtained as shown in the following formula (4):

$$C^{ib} = C^{ie} C^{et} C^{tb} \quad (4)$$

where $C^{tb}$ represents a transformation matrix from the carrier coordinate system to a horizontal coordinate system, $C^{et}$ represents a transformation matrix from the horizontal coordinate system to the earth coordinate system, and $C^{ie}$ represents a transformation matrix from the earth coordinate system to the inertial coordinate system.

$C^{tb}$ may be obtained from the information such as the course angle, the pitch angle, the roll angle and the like about the spatial terminal in the carrier coordinate system.

Step c, the displacement of the spatial terminal after the time period in the inertial coordinate system is obtained based on the third position coordinate, the running speed and the triaxial acceleration.

In some embodiments, step c may be obtained as shown in the following formula (5):

$$r_n^i = p_{n,0}^i + \int_{t_0}^{t_0+\Delta t}\left(v_{n,0}^i + \int_{t_0}^{t_0+\Delta t} a_{n,t}^i dt\right)dt \quad (5)$$

where $r_n^i$ represents the displacement of the spatial terminal n in the inertial coordinate system after a time period $\Delta t$ from the current moment $t_0$; $v_{n,0}^i$ represents the running speed of the spatial terminal at the current moment $t_0$; $a_{n,t}^i$ represents the triaxial acceleration of the spatial terminal n in the inertial coordinate system at the moment t; $p_{n,0}^i$ represents the third position coordinate of the spatial terminal in the inertial coordinate system.

Step d, the second position information is obtained by converting the displacement based on the first transformation matrix from the inertial coordinate system to the earth coordinate system.

The second position coordinate is a coordinate of the second position where the spatial terminal is located after the time period, and the position coordinate is a coordinate in the earth coordinate system.

In some embodiments, step d may be obtained as shown in the following formula (6):

$$r_n^e = C^{ei} r_n^i \quad (6)$$

where $C^{ei}$ represents a transformation matrix from the inertial coordinate system to the earth coordinate system, and for convenience of distinction, the transformation matrix is referred to as the first transformation matrix; $r_n^e$ represents the second position coordinate of the spatial terminal in the earth coordinate system.

It may be seen from the above-mentioned process of obtaining the second position information according to the first position information and the motion state information that the second position information is determined by converting the displacement of the spatial terminal in the inertial coordinate system after the time period based on the first transformation matrix from the inertial coordinate system to the earth coordinate system; the displacement is obtained based on the third position coordinate of the spatial terminal in the inertial coordinate system, the running speed and the triaxial acceleration; the triaxial acceleration and the running speed are obtained based on the motion state information; and the third position coordinate is obtained by converting the first position coordinate based on the second transformation matrix from the earth coordinate system to the inertial coordinate system.

In step 403, the first stereo cell where the spatial terminal is located is determined based on the first position information where the spatial terminal is located.

Step 403 may be executed before step 402, after step 402, or simultaneously with step 402. The present disclosure does not limit the execution timing of step 403, and step 403 only needs to be executed after step 401.

In step 404, the second stereo cell to be switched for the spatial terminal is determined based on the second position information where the spatial terminal is located after the time period and the cell handover strategy.

Step 404 may be executed before step 403, after step 403, or simultaneously with step 403, and the present disclosure does not limit the execution timing of step 404, and step 404 only needs to be executed after step 402.

In step 405, the handover message is sent to the spatial terminal to indicate the spatial terminal to switch from the first stereo cell to the second stereo cell.

The specific implementation and principles of steps 403-405 may be described with reference to other embodiments and will not be described in detail herein.

Accordingly, with the cell handover method provided by embodiments of the present disclosure, by dividing the service area of the network device into the three-dimensional stereo cell, the first network device obtains the first position information and the motion state information from the spatial terminal, the second position information where the spatial terminal is located after the time period is determined based on the first position information and the motion state information, the first stereo cell where the spatial terminal is located is determined based on the first position information where the spatial terminal is located, the second stereo cell to be switched for the spatial terminal is determined based on the second position information where the spatial terminal is located after the time period and the cell handover strategy, and the handover message is sent to the spatial terminal to indicate the spatial terminal to switch from the first stereo cell to the second stereo cell. In this way, it may be achieved that the second stereo cell to be switched is predicted for the spatial terminal in advance before the spatial terminal moves out of the first stereo cell where the spatial terminal is located, so that the spatial terminal is switched to the second stereo cell in time, thereby ensuring the continuity of service and the reliability of communication and improving the quality of service for the spatial terminal at any position in the three-dimensional space such as the ground, the sea surface or the air. Moreover, the second stereo cell to be switched is predicted based on the second position information where the spatial terminal is located after the time period by the first network device, which may avoid the spatial terminal sending the measurement report to the first network device, reduce the time delay and improve the accuracy of the determined second stereo cell. Furthermore, the spatial terminal may only send the first position information where the spatial terminal is located and the motion state information to the first network device, thereby reducing occupied transmission resources and reducing overhead of the communication system and link.

Figure 5:
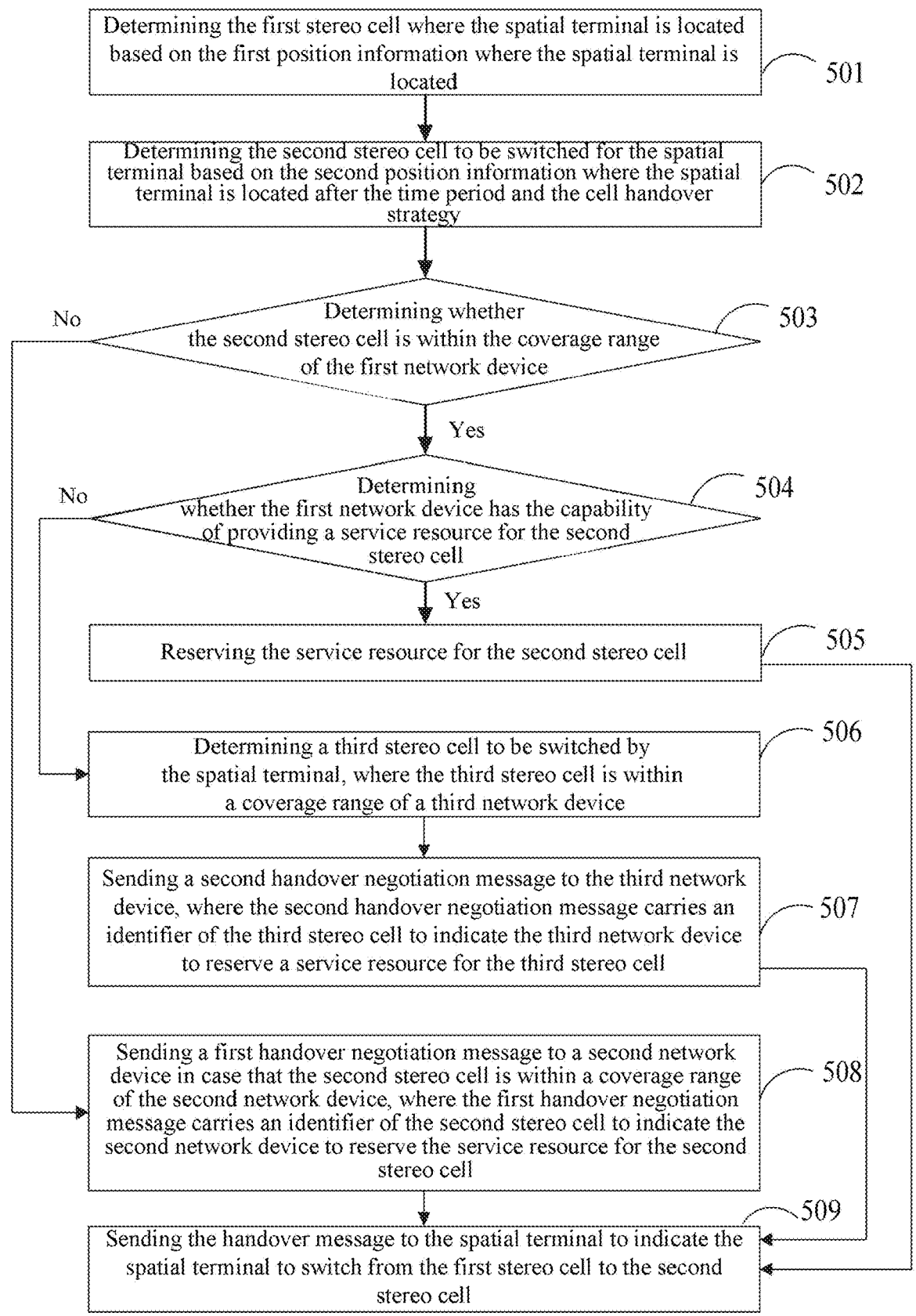
FIG. 5 is a flow diagram illustrating a cell handover method according to embodiments of the present disclosure.

FIG. 5 is a flow diagram illustrating a cell handover method according to embodiments of the present disclosure.

The cell handover method is applied to the first network device. The first network device is the network device that provides service for the spatial terminal.

As shown in FIG. 5, embodiments of the present disclosure relate to a method including the following steps 501-509.

In step 501, the first stereo cell where the spatial terminal is located is determined based on the first position information where the spatial terminal is located.

The first stereo cell is served by the first network device.

In step 502, the second stereo cell to be switched for the spatial terminal is determined based on the second position information where the spatial terminal is located after the time period and the cell handover strategy.

The specific implementation and principles of steps 501-502 may be described with reference to other embodiments and will not be described in detail herein.

In step 503, it is determined whether the second stereo cell is within the coverage range of the first network device, in case that the second stereo cell is within the coverage range of the first network device, step 504 is performed, otherwise, step 508 is performed.

In step 504, it is determined whether the first network device has the capability of providing a service resource for the second stereo cell, in case that the first network device has the capability of providing the service resource for the second stereo cell, step 505 is performed, otherwise, step 506 is performed.

In some embodiments, in the case that the second stereo cell is within the coverage range of the first network device, a further determination may be made as to whether the first network device has the capability of providing the service resource for the second stereo cell.

In step 505, the service resource for the second stereo cell are reserved.

The service resource may include resources such as frequency resources and codeword resources for the communication.

In some embodiments, in case that the second stereo cell is within the coverage range of the first network device and the first network device has the capability of providing the service resource for the second stereo cell, the first network device may reserve the service resource for the second stereo cell.

The service resource for the second stereo cell is reserved by the first network device, the continuity of communication may be ensured.

In step 506, a third stereo cell to be switched by the spatial terminal is determined, where the third stereo cell is within a coverage range of a third network device.

In some embodiments, in case that the second stereo cell is within the coverage range of the first network device and the first network device does not have the capability of providing the service resource for the second stereo cell, the first network device may determine the third stereo cell to be switched by the spatial terminal.

A determination method of the third stereo cell is similar to a determination method of the second stereo cell, and the description thereof will not be repeated here.

The third network device is a network device covering the third stereo cell, and the network device and the first network device are different network devices.

In step 507, a second handover negotiation message is sent to the third network device, where the second handover negotiation message carries an identifier of the third stereo cell to indicate the third network device to reserve a service resource for the third stereo cell.

In some embodiments, the first network device may send the second handover negotiation message to the third network device by an inter-satellite link or by a ground operation control centre, where the second handover negotiation message carries the identifier of the third stereo cell to indicate the third network device to reserve the service resource for the third stereo cell. In this way, the third network device may reserve the service resource for the third stereo cell.

In some embodiments, the second handover negotiation message may further carry the motion state information and the position information about the spatial terminal, so that the third network device predicts a stereo cell into which the spatial terminal will enter according to the motion state information and the position information about the spatial terminal, and reserves resources of the stereo cell.

The service resource for the third stereo cell is reserved by the third network device, so that the continuity of communication may be ensured.

In step 508, a first handover negotiation message is sent to a second network device in case that the second stereo cell is within a coverage range of the second network device, where the first handover negotiation message carries an identifier of the second stereo cell to indicate the second network device to reserve the service resource for the second stereo cell.

The service resource for the second stereo cell is reserved by the second network device, so that the continuity of communication may be ensured.

In step 509, the handover message is sent to the spatial terminal to indicate the spatial terminal to switch from the first stereo cell to the second stereo cell.

In some embodiments, the handover message may carry the identifier of the second stereo cell to indicate the spatial terminal to perform the cell handover based on the identifier.

In some embodiments, stereo cells may be assigned corresponding codewords such that the spatial terminals in the stereo cells may employ the corresponding codewords for the data transmission. In some embodiments, the stereo cells may be assigned the codewords corresponding to the heights where the stereo cells are located according to the heights where the stereo cells are located. The assigned codewords may be the same or different for any two stereo cells at different heights. The assigned codewords may be the same or different for any two stereo cells at the same height.

For example, heights where the divided stereo cell is located, including a height A, a height B, a height C and a height D, are taken as an example. A codeword C1 corresponding to the height A may be assigned for a stereo cell at the height A; a codeword C2 corresponding to the height B may be assigned for a stereo cell at the height B; a codeword C3 corresponding to the height C may be assigned for a stereo cell at the height C; a codeword C4 corresponding to the height D may be assigned for a stereo cell at the height D, where C1, C2, C3, C4 are different. In this way, it is possible to assign the same codeword for the stereo cells at the same height and different codewords for the stereo cells at different heights.

Alternatively, a codeword C5 corresponding to the height A and the height B may be assigned to the stereo cell at the height A and the stereo cell at the height B, and a codeword C6 corresponding to the height C and the height D may be assigned to the stereo cell at the height C and the stereo cell at the height D, where C5 and C6 are different. In this way, it is possible to assign the same codeword for stereo cells at the same height, and to assign different codewords for stereo cells at partially different heights among the multiple heights.

By assigning different codewords to the stereo cells at different heights, interference by the terminal devices in the stereo cells at different heights may be avoided in a case of communicating with the network devices.

It should be noted that the above-mentioned manner of assigning the codewords corresponding to the heights where the stereo cells are located according to the heights where the stereo cells are located is merely an example, and in practical applications, other manners of assigning the codewords corresponding to the stereo cells may further be used, and the present disclosure is not limited thereto.

In addition, it should be noted that the coverage area of the stereo cell in embodiments of the present disclosure includes the three-dimensional stereo area. The height where the stereo cell is located may be a height where any position of the stereo cell is located, and the height may be an absolute height value or a relative height value, and may further be a height range which is one of the multiple height ranges divided in the height dimension. Alternatively, the height where the stereo cell is located may further be the height range, which is one of the multiple height ranges divided in the height dimension, where the whole stereo cell is located. For example, in a case where the three-dimensional space is divided into the multiple stereo cells in the manner shown in FIG. 3, the height where the stereo cell (M, L) is located may be understood as the height range $H_L$, and embodiments of the present disclosure do not limit the manner of defining the height where the stereo cell is located.

In some embodiments, in a case where heights of the first stereo cell and the second stereo cell are different, codewords corresponding to the first stereo cell and the second stereo cell may be different, and the handover message may carry the codeword information corresponding to the height where the second stereo cell is located to indicate the spatial terminal to perform the cell handover based on the codeword information. The codeword information is information related to a codeword corresponding to the height where the second stereo cell is located, such as an identifier of the codeword or specific content of the codeword, and the present disclosure is not limited thereto.

In some embodiments, a codeword corresponding to a height where the first stereo cell is located and a codeword corresponding to a height where the second stereo cell is located are mutually orthogonal or mutually quasi-orthogonal.

In some embodiments, in a case where the first stereo cell and the second stereo cell are covered by different beams, the handover message may carry relevant information about the beam covering the second stereo cell to indicate the spatial terminal to perform the cell handover based on the relevant information about the beam. The relevant information about the beam may include one or more of information such as an identifier of the beam and corresponding frequency of the beam.

The beam covering the second stereo cell may be a beam included by the first network device or other network devices.

The following is an example of the information carried in the handover message in multiple scenarios.

In a case where the heights of the first stereo cell and the second stereo cell are different, and the first stereo cell and the second stereo cell are covered by different beams, the first network device may determine that the spatial terminal needs to perform codeword switching and beam switching, so that the handover message may carry: the codeword information corresponding to the height where the second stereo cell is located and the relevant information about the beam covering the second stereo cell, and indicate that the spatial terminal performs the cell handover based on the codeword information and the relevant information about the beam.

In a case where the heights of the first stereo cell and the second stereo cell are different, and the first stereo cell and the second stereo cell are covered by the same beam, the first network device may determine that the spatial terminal needs to perform the codeword switching, and the beam remains unchanged, so that the handover message may carry: the codeword information corresponding to the height where the second stereo cell is located, and indicate that the spatial terminal performs the cell handover based on the codeword information.

In a case where the height where the first stereo cell and the second stereo cell are located is the same, and the first stereo cell and the second stereo cell are covered by different beams, the first network device may determine that the spatial terminal needs to perform the beam switching, and the codeword remains unchanged, so that the handover message may carry: the relevant information about the beam covering the second stereo cell, and indicate that the spatial terminal performs the cell handover based on the relevant information about the beam.

Accordingly, with the cell handover method provided by embodiments of the present disclosure, by dividing the service area of the network device into the three-dimensional stereo cell, the first stereo cell where the spatial terminal is located is determined based on the first position information where the spatial terminal is located, the second stereo cell to be switched for the spatial terminal is determined based on the second position information where the spatial terminal is located after the time period and the cell handover strategy, and the handover message is sent to the spatial terminal to indicate the spatial terminal to switch from the first stereo cell to the second stereo cell. In this way, it may be achieved that the second stereo cell to be switched is predicted for the spatial terminal in advance before the spatial terminal moves out of the first stereo cell where the spatial terminal is located, so that the spatial terminal is switched to the second stereo cell in time, thereby ensuring the continuity of service and the reliability of communication and improving quality of service for the spatial terminal at any position in the three-dimensional space such as the ground, the sea surface or the air. Moreover, the second stereo cell to be switched is predicted based on the second position information where the spatial terminal is located after the time period by the first network device, which may avoid the spatial terminal sending the measurement report to the first network device, reduce the time delay and improve the accuracy of the determined second stereo cell. By reserving the service resource for the second stereo cell, the continuity of communication may be ensured.

Hereinafter, the cell handover method applied to the spatial terminal provided by embodiments of the present disclosure will be described in detail.

Figure 6:
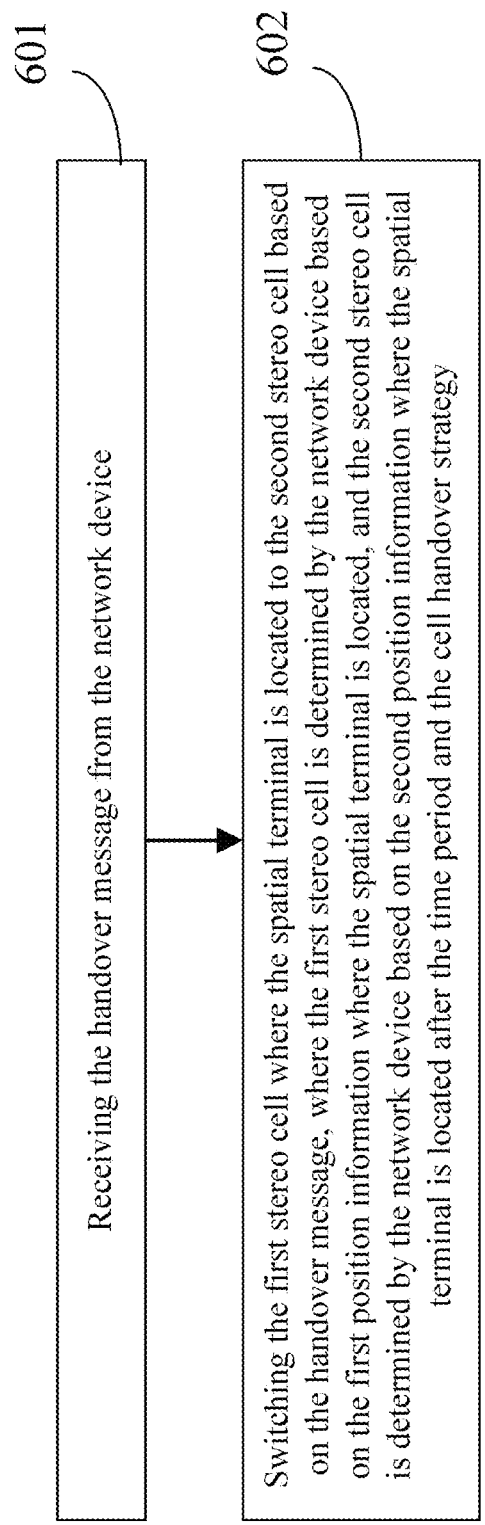
FIG. 6 is a flow diagram illustrating a cell handover method according to embodiments of the present disclosure.

FIG. 6 is a flow diagram illustrating a cell handover method according to embodiments of the present disclosure. As shown in FIG. 6, embodiments of the present disclosure relate to a method including the following steps 601-602.

In step 601, the handover message is received from the network device.

The network device sending the handover message is a network device serving the spatial terminal at the current moment, such as the first network device in the previous embodiments.

In step 602, the first stereo cell where the spatial terminal is located is switched to the second stereo cell based on the handover message, where the first stereo cell is determined by the network device based on the first position information where the spatial terminal is located, and the second stereo cell is determined by the network device based on the second position information where the spatial terminal is located after the time period and the cell handover strategy.

The handover message indicates the spatial terminal to switch from the first stereo cell to the second stereo cell based on the handover message.

The first position information, which is the information about the first position where the spatial terminal is located at the current moment, may include the longitude information, the latitude information, the altitude information and the like.

In some embodiments, the first position information may be obtained by the spatial terminal and sent to the first network device.

In some embodiments, the navigation receiver module or the position sensor may be configured in the spatial terminal, and the spatial terminal may obtain the first position information where the spatial terminal is located in real time by the navigation receiver module or the position sensor, and then the first position information is sent to the network device, so that the network device determines the first stereo cell where the spatial terminal is located based on first position information.

The first stereo cell is the stereo cell where the spatial terminal is located, which covers the first position where the spatial terminal is located.

The time period may be arranged as required, and the present disclosure is not limited thereto.

The second position information is the information about the second position where the spatial terminal is located after the time period, and may include the longitude information, the latitude information, the height information and the like.

In some embodiments, the spatial terminal may predict the second position after the time period by itself, and send the information about the second location, namely, the second position information, to the first network device, so that the network device determines the second stereo cell based on the second position information where the spatial terminal is located after the time period.

The second stereo cell is the stereo cell into which the predicted spatial terminal enters after the time period. The number of the second stereo cells may be one or more, and the present disclosure is not limited thereto. Any second stereo cell may be served by the network device serving the spatial terminal at the current time, or by other network devices.

The cell handover strategy is the strategy for determining the second stereo cell from the multiple stereo cells, and may be arranged as required. The present disclosure is not limited thereto. For an explanation of the cell handover strategy, reference may be made to other embodiments, which will not be repeated here.

Accordingly, with the cell handover method provided by embodiments of the present disclosure, the handover message is received from the network device, and the first stereo cell where the spatial terminal is located is switched to the second stereo cell based on the handover message, where the first stereo cell is determined by the network device based on the first position information where the spatial terminal is located, and the second stereo cell is determined by the network device based on the second position information where the spatial terminal is located after the time period and the cell handover strategy. In this way, based on dividing the service area of the network device into the three-dimensional stereo cell, the spatial terminal may timely switch from the first stereo cell located to the second stereo cell according to the handover message sent by the network device, thereby ensuring the continuity of communication with the network device and improving communication quality and the communication reliability. Moreover, the second stereo cell to be switched is predicted based on the second position information where the spatial terminal is located after the time period by the network device, which may avoid the spatial terminal sending the measurement report to the network device, reduce the time delay and improve the accuracy of the determined second stereo cell.

Figure 7:
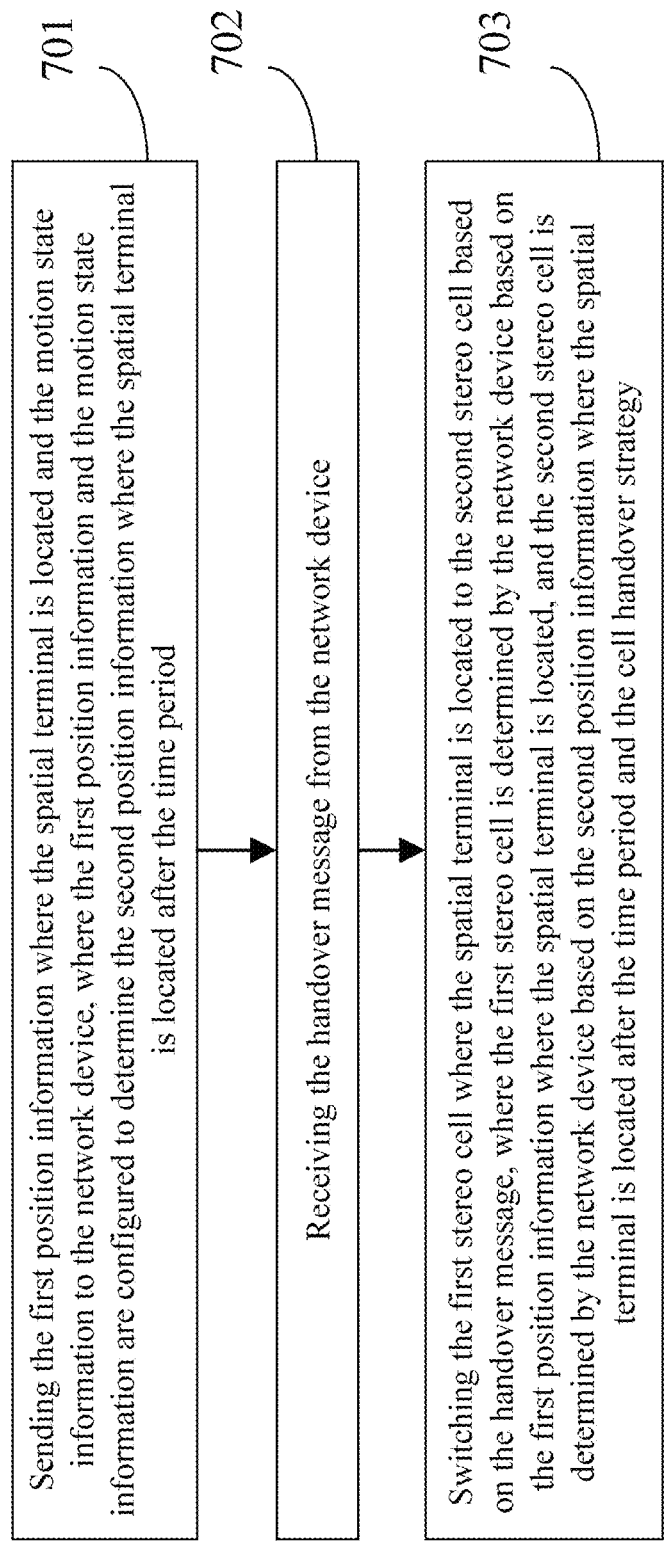
FIG. 7 is a flow diagram illustrating a cell handover method according to embodiments of the present disclosure.

FIG. 7 is a flow diagram illustrating a cell handover method according to embodiments of the present disclosure. As shown in FIG. 7, embodiments of the present disclosure relate to a method including the following steps 701-703.

In step 701, the first position information where the spatial terminal is located and the motion state information are sent to the network device, where the first position information and the motion state information are configured to determine the second position information where the spatial terminal is located after the time period.

The first position information, which is the information about the first position where the spatial terminal is located at the current moment, may include the longitude information, the latitude information, the altitude information and the like.

The motion state information may include the information indicating the motion state of the spatial terminal, such as the motion vector of the spatial terminal at any time, the running speed of the spatial terminal at current time and the like. The motion vector may include the information such as the triaxial acceleration, the course angle, the pitch angle, the roll angle and the like.

In some embodiments, the spatial terminal may be equipped with the inertial navigation sensor through which the spatial terminal may obtain the motion vector at any time, and then send the motion state information, such as the motion vector and the running speed at the current moment, to the network device. The first position information is configured for the network device to obtain the second position information and determine the first stereo cell where the spatial terminal is located; and the motion state information is configured for the network device to obtain the second position information.

In step 702, the handover message is received from the network device.

In step 703, the first stereo cell where the spatial terminal is located is switched to the second stereo cell based on the handover message, where the first stereo cell is determined by the network device based on the first position information where the spatial terminal is located, and the second stereo cell is determined by the network device based on the second position information where the spatial terminal is located after the time period and the cell handover strategy.

In some embodiments, the heights of the first stereo cell and the second stereo cell are different, and the handover message may carry the codeword information corresponding to the height where the second stereo cell is located. The spatial terminal may switch from the first stereo cell to the second stereo cell based on the codeword information to use a codeword corresponding to the codeword information to communicate with the network device. The codeword information is the information related to the codeword corresponding to the height where the second stereo cell is located, such as the identifier of the codeword or the specific content of the codeword, and the present disclosure is not limited thereto.

In some embodiments, the first stereo cell and the second stereo cell are covered by different beams, and the handover message may carry the relevant information about the beam covering the second stereo cell. The spatial terminal may switch from the first stereo cell to the second stereo cell based on the relevant information about the beam to communicate with the network device based on the beam. The relevant information about the beam may include one or more of information such as the identifier of the beam and the corresponding frequency of the beam.

In some embodiments, the heights of the first stereo cell and the second stereo cell are different, the first stereo cell and the second stereo cell are covered by different beams, and the handover message may carry the codeword information corresponding to the height where the second stereo cell is located and the relevant information about the beam covering the second stereo cell. The spatial terminal may switch from the first stereo cell to the second stereo cell based on the relevant information about the beam and the codeword information to use the codeword corresponding to the codeword information and the beam to communicate with the network device.

It should be noted that, in some embodiments, in a process of the cell handover by the spatial terminal, resources not mentioned in the handover message may remain unchanged.

With the cell handover method provided by embodiments of the present disclosure, the first position information where the spatial terminal is located and the motion state information are sent to the network device, where the first position information and the motion state information are configured to determine the second position information where the spatial terminal is located after the time period; the handover message is received from the network device; and the first stereo cell where the spatial terminal is located is switched to the second stereo cell based on the handover message, where the first stereo cell is determined by the network device based on the first position information where the spatial terminal is located, and the second stereo cell is determined by the network device based on the second position information where the spatial terminal is located after the time period and the cell handover strategy. In this way, based on dividing the service area of the network device into the three-dimensional stereo cell, the spatial terminal may timely switch from the first stereo cell located to the second stereo cell according to the handover message sent by the network device, thereby ensuring the continuity of communication with the network device and improving the communication quality and the communication reliability. Moreover, the second stereo cell to be switched is predicted based on the second position information where the spatial terminal is located after the time period by the network device, which may avoid the spatial terminal sending the measurement report to the network device, reduce the time delay and improve the accuracy of the determined second stereo cell. Furthermore, the spatial terminal sends the first position information located and the motion state information to the network device, which reduces the occupied transmission resources, reduces the overhead of the communication system and the link, reduces the time delay and improves the accuracy of the second stereo cell determined by the network device.

Embodiments of the present disclosure further provide a device for implementing any of the above methods, for example, a device that includes a unit or module to implement the steps performed by the network device in any of the above methods. For another example, another device is provided that includes a unit or module to implement the steps performed by the spatial terminal in any of the above methods.

It is understood that a division of units or modules in the above device is merely a division of logical functions, and may be integrated in whole or in part into one physical entity or may be physically separated in actual implementation. In addition, the units or modules in the device may be implemented in a form of processor calling software: for example, the device includes a processor, e.g. a general-purpose processor such as a central processing unit (CPU) or a microprocessor, coupled to a memory, e.g. internal or external to the device, the processor invoking instructions stored in the memory to implement any of the methods described above or to implement the functions of various units or modules of the device described above. Alternatively, the units or modules of the device may be implemented in a form of hardware circuit, which may be understood as one or more processors, and function of some or all of the units or modules may be implemented by designing the hardware circuit. For example, in one implementation, the above-mentioned hardware circuit is an application-specific integrated circuit (ASIC), and the function of some or all of the above-mentioned units or modules is realized through design of logical relationships of elements in the circuit. As another example, in another implementation, the above-mentioned hardware circuit may be implemented by a programmable logic device (PLD), and for example, a field programmable gate array (FPGA) may include a large number of logic gates, and the connection relationship between the logic gates is configured by a configuration file to realize the functions of some or all of the above units or modules. All the units or modules of the above device may be implemented entirely in a form of calling the software by the processor, or entirely in the form of hardware circuit, or partly in the form of calling the software by the processor, and the remainder in the form of hardware circuit.

In embodiments of the present disclosure, the processor is a circuit having a signal processing capability. In one implementation, the processor may be a circuit having instruction fetch and run capabilities, such as the CPU, the microprocessor, a graphics processing unit (GPU) (which may be understood to be the microprocessor), or a digital signal processor (DSP), etc. In another implementation, the processor may implement a function through a logical relationship of hardware circuit that is fixed or reconfigurable. For example, the processor is the hardware circuit implemented as the ASIC or the PLD, such as the FPGA. In a reconfigurable hardware circuit, a process of the processor loading a configuration document to implement configuration of the hardware circuit may be understood as a process of the processor loading the instructions to implement some or all of the functions of the units or modules above. Furthermore, the processor may further be a hardware circuit designed for artificial intelligence, which may be understood as the ASIC, such as a neural network processing unit (NPU), a tensor processing unit (TPU), a deep learning processing unit (Unit, DPU), etc.

Figure 8:
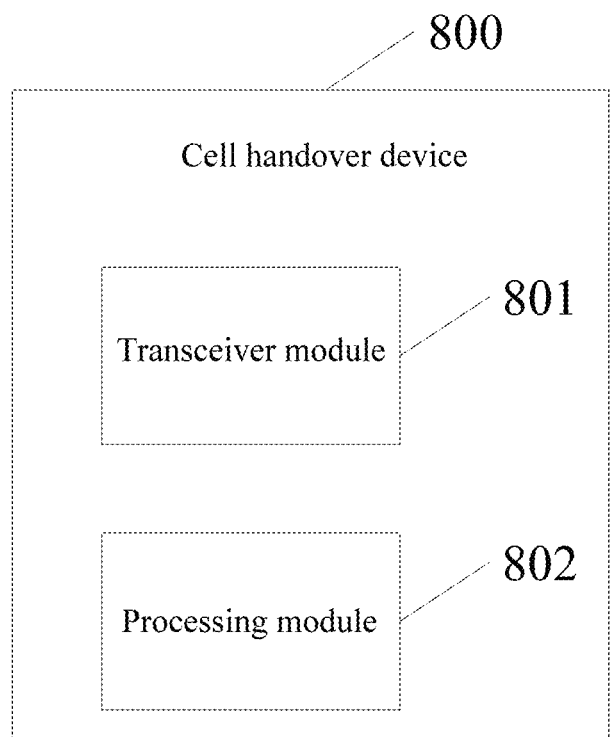
FIG. 8 is a structural diagram illustrating a cell handover device according to embodiments of the present disclosure.

FIG. 8 is a structural diagram illustrating a cell handover device according to embodiments of the present disclosure. The cell handover device may be applied to the network device such as the first network device in the aforementioned embodiments. As shown in FIG. 8, the cell handover device 800 may include: at least one of a transceiver module 801 or a processing module 802.

In some embodiments, the processing module 802 is configured to determine the first stereo cell where the spatial terminal is located based on the first position information where the spatial terminal is located, and determine the second stereo cell to be switched for the spatial terminal based on the second position information where the spatial terminal is located after the time period and the cell handover strategy; and the transceiver module 801 is configured to send the handover message to the spatial terminal to indicate the spatial terminal to switch from the first stereo cell to the second stereo cell.

In some embodiments, the transceiver module 801 is configured to obtain the the first position information and the motion state information from the spatial terminal; and the processing module 802 is configured to determine the second position information based on the first position information and the motion state information.

In some embodiments, the first position information includes the first position coordinate in the earth coordinate system; the second position information includes the second position coordinate in the earth coordinate system; the second position information is obtained by converting the displacement of the spatial terminal in the inertial coordinate system after the time period based on the first transformation matrix from the inertial coordinate system to the earth coordinate system; the displacement is obtained based on the third position coordinate of the spatial terminal in the inertial coordinate system, the running speed and the triaxial acceleration; the triaxial acceleration and the running speed are obtained based on the motion state information; and the third position coordinate is obtained by converting the first position coordinate based on the second transformation matrix from the earth coordinate system to the inertial coordinate system.

In some embodiments, the heights of the first stereo cell and the second stereo cell are different, and the handover message carries the codeword information corresponding to the height where the second stereo cell is located, and indicates the spatial terminal to perform the cell handover based on the codeword information.

In some embodiments, the codeword corresponding to the height where the first stereo cell is located and the codeword corresponding to the height where the second stereo cell is located are mutually orthogonal or mutually quasi-orthogonal.

In some embodiments, the first stereo cell and the second stereo cell are covered by different beams, and the handover message carries the relevant information about the beam covering the second stereo cell to indicate the spatial terminal to perform the cell handover based on the relevant information about the beam.

In some embodiments, the transceiver module 801 is configured to send the first handover negotiation message to the second network device in the case that the second stereo cell is within the coverage range of the second network device, where the first handover negotiation message carries the identifier of the second stereo cell to indicate the second network device to reserve the service resource for the second stereo cell.

In some embodiments, the processing module 802 is configured to reserve the service resource for the second stereo cell in the case that the second stereo cell is within the coverage range of the first network device, and the first network device has the capability of providing the service resource for the second stereo cell.

In some embodiments, the processing module 802 is configured to determine the third stereo cell to be switched by the spatial terminal in the case that the second stereo cell is within the coverage range of the first network device, and the first network device does not have the capability of providing the service resource for the second stereo cell, where the third stereo cell is within the coverage range of the third network device; and the transceiver module 801 is configured to send the second handover negotiation message to the third network device, where the second handover negotiation message carries the identifier of the third stereo cell to indicate the third network device to reserve the service resource for the third stereo cell.

Figure 9:
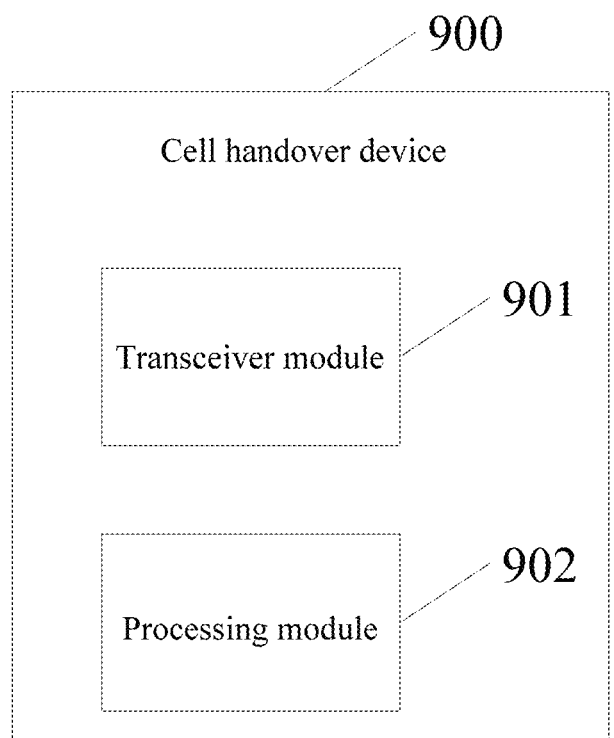
FIG. 9 is a structural diagram illustrating a cell handover device according to embodiments of the present disclosure.

FIG. 9 is a structural diagram illustrating a cell handover device according to embodiments of the present disclosure. The cell handover device may be applied to the spatial terminal. As shown in FIG. 9, the cell handover device 900 may include: at least one of a transceiver module 901 or a processing module 902.

In some embodiments, the transceiver module 901 is configured to receive the handover message from the network device; the processing module 902 is configured to switch from the first stereo cell where the spatial terminal is located to the second stereo cell based on the handover message, where the first stereo cell is determined by the network device based on the first position information where the spatial terminal is located, and the second stereo cell is determined by the network device based on the second position information where the spatial terminal is located after the time period and the cell handover strategy.

In some embodiments, the transceiver module 901 is configured to send the first position information to the network device.

In some embodiments, the transceiver module 901 is configured to send the first position information and the motion state information to the network device, where the first position information and the motion state information are configured to determine the second position information.

In some embodiments, the heights of the first stereo cell and the second stereo cell are different, and the handover message carries the codeword information corresponding to the height where the second stereo cell is located; and the processing module 902 is configured to switch from the first stereo cell to the second stereo cell based on the codeword information.

In some embodiments, the first stereo cell and the second stereo cell are covered by different beams, and the handover message carries the relevant information about the beam covering the second stereo cell; and the processing module 902 is configured to switch from the first stereo cell to the second stereo cell based on the relevant information about the beam.

Figure 10:
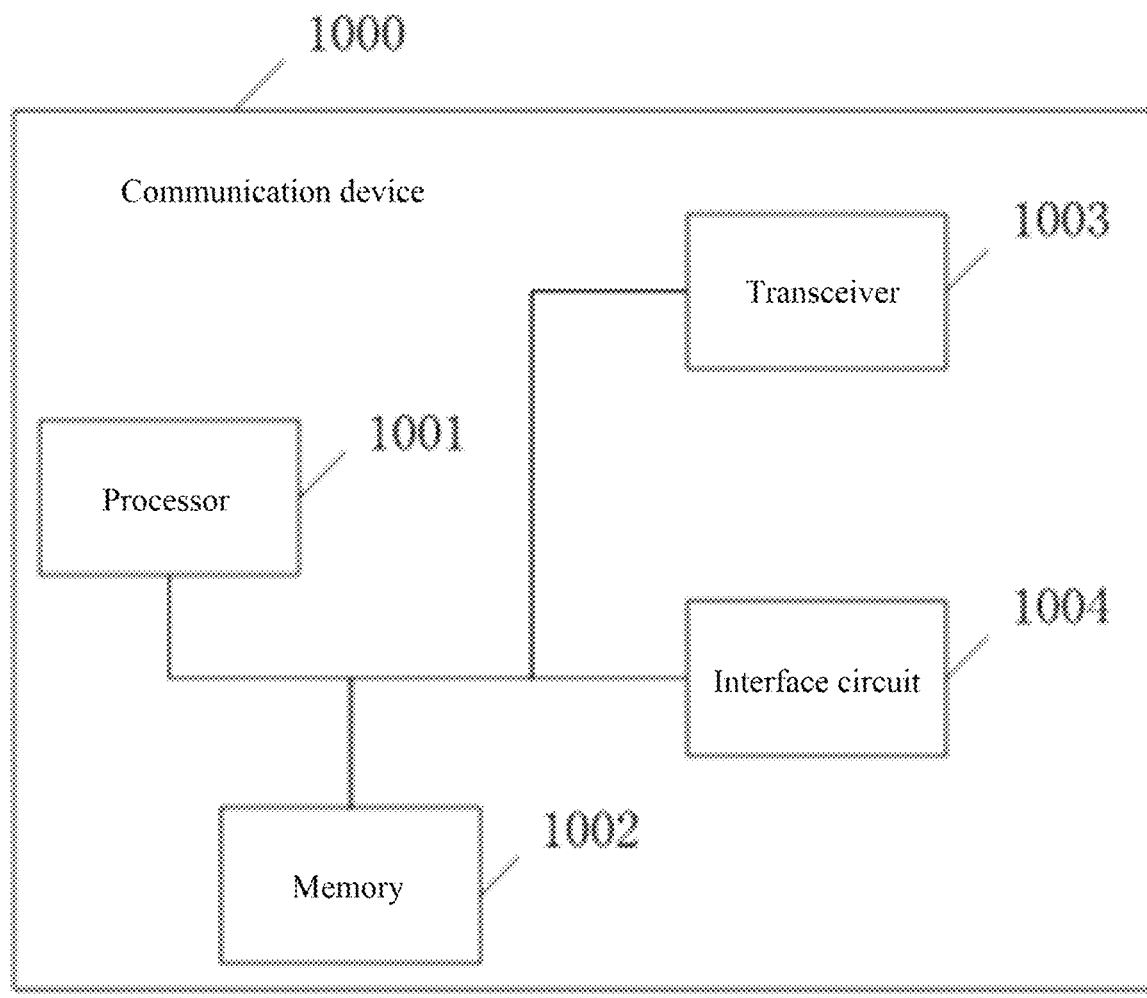
FIG. 10 is a structural diagram illustrating a communication device according to embodiments of the present disclosure.

FIG. 10 is a structural diagram illustrating a communication device 1000 according to embodiments of the present disclosure. The communication device 1000 may be the network device, the spatial terminal, or a chip, a chip system or a processor supporting the network device to implement the above-mentioned method, or a chip, a chip system or a processor supporting the spatial terminal to implement the above-mentioned method. The communication device 1000 may be configured to implement the method as described in any of the method embodiments described above, with particular reference to the description of the method embodiments described above.

As shown in FIG. 10, the communication device 1000 includes one or more processors 1001. The processor 1001 may be the general-purpose processor or a special-purpose processor, etc., for example, a baseband processor or a central processor. The baseband processor may be configured to process a communication protocol and communication data, and the central processor may be configured to control the communication device (such as the base station, a baseband chip, a terminal, a terminal chip, a distributed unit (DU) or a central unit (CU), etc.), execute a program and process data of the program. The processor 1001 is configured to invoke the instructions to enable the communication device 1000 to perform any of the above methods.

In some embodiments, the communication device 1000 further includes one or more memories 1002 for storing the instructions. In some embodiments, all or part of memory 1002 may further be external to the communication device 1000.

In some embodiments, the communication device 1000 further includes one or more transceivers 1003. In case that the communication device 1000 includes one or more transceivers 1003, communication steps of the method described above, such as sending and receiving, are performed by the transceiver 1003, and the other steps are performed by the processor 1001.

In some embodiments, the transceiver 1003 may include a receiver and a transmitter, which may be separate or integrated. In some embodiments, terms transceiver, transceiving unit, transceiver, transceiving circuit, etc. may be substituted for each other, terms transmitter, transmitting unit, transmitter, transmitting circuit, etc. may be substituted for each other, and terms receiver, receiving unit, receiver, receiving circuit, etc. may be substituted for each other.

In some embodiments, the communication device 1000 further includes one or more interface circuits 1004 coupled to the memory 1002, the interface circuits 1004 is configured to receive signals from the memory 1002 or other devices and configured to transmit the signals to the memory 1002 or other devices. For example, the interface circuit 1004 may read the instructions stored in the memory 1002 and send the instructions to the processor 1001.

The communication device 1000 in the above embodiments may be the network device or the spatial terminal, but scope of the communication device 1000 described in the present disclosure is not limited thereto. The structure of the communication device 1000 may not be limited by FIG. 10. The communication device may be a stand-alone device or may be a part of a larger device. For example, the communication device may be: (1) a stand-alone integrated circuit (IC), or a chip, or a chip system or a subsystem; (2) a set of one or more ICs, optionally the set of ICs may also include a storage component for storing the data and the computer program; (3) ASIC such as modem; (4) modules that may be embedded in other devices; (5) a receiver, a terminal device, an intelligent terminal device, a cellular phone, a wireless device, a handset, a mobile unit, an on-vehicle device, a network device, a cloud device, an artificial intelligence device, etc.; (6) others.

Figure 11:
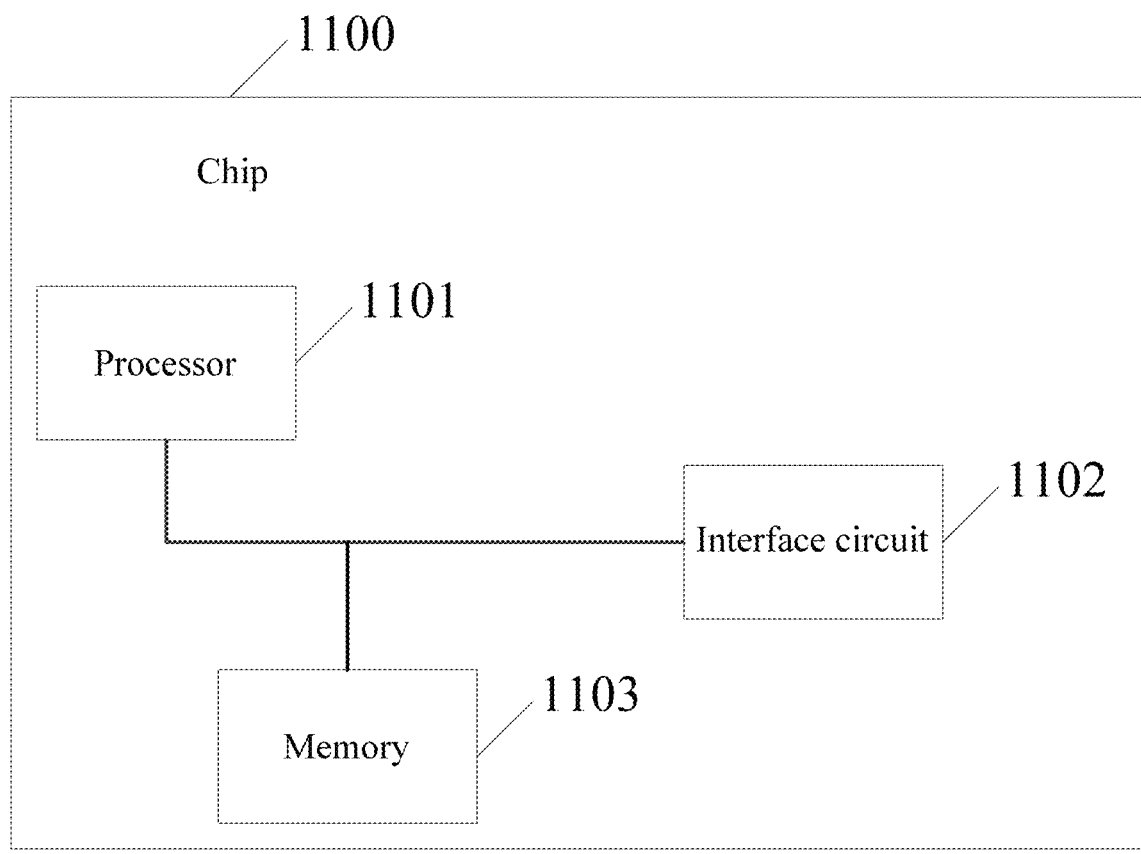
FIG. 11 is a schematic diagram illustrating a structure of a chip according to embodiments of the present disclosure.

FIG. 11 is a schematic diagram illustrating a structure of a chip according to embodiments of the present disclosure. Regarding a case where the communication device 1000 may be the chip or the chip system, reference may be made to the structural diagram of a chip 1100 shown in FIG. 11, but is not limited thereto.

The chip 1100 includes one or more processors 1101 for invoking the instructions to enable the chip 1100 to perform any of the above methods.

In some embodiments, the chip 1100 further includes one or more interface circuits 1102 coupled to a memory 1103, the interface circuits 1102 may be configured to receive the signals from the memory 1103 or other devices, and the interface circuits 1102 may be configured to send the signals to the memory 1103 or other devices. For example, the interface circuits 1102 may read the instructions stored in the memory 1103 and send the instructions to the processor 1101. In some embodiments, terms interface circuit, interface, transceiver pin, transceiver, etc. may be substituted for each other.

In some embodiments, the chip 1100 further includes one or more memories 1103 for storing the instructions. In some embodiments, all or part of the memory 1103 may be external to the chip 1100.

The present disclosure further provides the communication system including: the spatial terminal and the network device, where the spatial terminal is configured to perform the method as described in the first aspect or the alternative implementation of the first aspect and the network device is configured to perform the method as described in the second aspect or the alternative implementation of the second aspect.

The present disclosure further provides the storage medium having stored thereon the instructions that, when executed on the communication device 1000, enable the communication device 1000 to perform any of the above methods. In some embodiments, the storage medium is an electronic storage medium. In some embodiments, the storage medium described above is a computer-readable storage medium, but is not limited thereto, and may be a storage medium readable by other apparatuses. In some embodiments, the storage medium may be, but is not limited to, a non-transitory storage medium, and may further be a transitory storage medium.

The present disclosure further provides the program product that, when executed by the communication device 1000, enables the communication device 1000 to perform any of the above methods. In some embodiments, the program product is the computer program product.

The present disclosure further provides the computer program that, when executed on the computer, enables the computer to perform any of the above methods.

It is understood that the above described cell handover device, spatial terminal, network device, communication system, storage medium, program product, computer program are all for performing the method provided by embodiments of the present disclosure. Therefore, advantageous effects thereof may be obtained by referring to advantageous effects in the corresponding method, and the description thereof will not be repeated here.

In some embodiments, terms such as cell handover method and information processing method, communication method, etc. may be substituted for each other, terms such as cell handover device and information processing device, communication device, etc. may be substituted for each other, and terms such as information processing system, communication system, etc. may be substituted for each other.

Embodiments of the present disclosure are not exhaustive, but only illustrative of some embodiments, and do not specifically limit the scope of the present disclosure. In case of no contradiction, each step in a certain embodiment may be implemented as an independent embodiment, and the steps may be arbitrarily combined. For example, in a certain embodiment, a solution after removing part of the steps may also be implemented as the independent embodiment, and the order of the steps in a certain embodiment may be arbitrarily exchanged. Moreover, alternative implementations in a certain embodiment may be arbitrarily combined. Furthermore, various embodiments may be arbitrarily combined, e.g. some or all of the steps of different embodiments may be arbitrarily combined, and a certain embodiment may be combined in any combination with alternative implementations of other embodiments.

In the various embodiments of the present disclosure, the terms and/or descriptions used in the various embodiments are consistent with each other and may be referred to each other without specific recitation or logical conflict, and technical features in different embodiments may be combined to form new embodiments according to their inherent logical relationships.

The terms used in embodiments of the present disclosure is for a purpose of describing particular embodiments only and is not intended to be limiting of the present disclosure.

In embodiments of the present disclosure, unless otherwise specified, elements expressed in singular, such as "a", "an", "the", "above", "said", "preceding", "the", etc., may mean "one and only one", and may also mean "one or more", "at least one" and the like. For example, in a case where an article such as "a", "an", "the" or the like is used in translation, the article-following noun may be understood as a singular expression or a plural expression.

In embodiments of the present disclosure, "multiple" means two or more.

In some embodiments, a description mode such as "A" or "B" may include the following technical solutions according to circumstances: in some embodiments A (A is performed independently of B); in some embodiments B (B is performed independently of A); in some embodiments, execution is selected from A and B (A and B are selectively executed). This is also true when there are more branches such as A, B, C.

Prefixes such as "first", "second" and the like in embodiments of the present disclosure are merely used for distinguishing different description objects and do not constitute a limitation on position, order, priority, number or content of the description objects, and statement on the description objects shall refer to the context in the claims or embodiments, and shall not constitute an unnecessary limitation due to the use of the prefixes. For example, in case that the description object is "field", an ordinal word preceding the "field" in a "first field" and a "second field" does not limit position or order between the "fields", and the "first" and the "second" do not limit whether the "fields" modified thereby are in the same message, nor do they limit the order of the "first field" and the "second field". As another example, in case that the description object is "level", the ordinal word preceding the "level" in a "first level" and a "second level" does not limit the priority between the "levels". As another example, the number of description objects is not limited by ordinal terms, and may be one or more, for example, a "first device", where the number of "devices" may be one or more. In addition, objects modified by different prefixes may be the same or different. For example, in case that the description object is the "device", the "first device" and a "second device" may be the same device or different devices, and the types thereof may be the same or different. As another example, in case that the description object is "information", "first information" and "second information" may be the same information or different information, and the contents thereof may be the same or different.

In some embodiments, "comprising E", "including E", "configured to indicate E", "carrying E", may be interpreted as either directly carrying E or indirectly indicating E.

In some embodiments, terms "greater than", "greater than or equal to", "no less than", "more than", "more than or equal to", "no less than", "higher than", "higher than or equal to", "no less than", "above", and the like may be substituted for each other, terms "less than", "less than or equal to", "no greater than", "less than", "less than or equal to", "no more than", "less than", "less than or equal to", "no greater than", "below" and the like may be substituted for each other.

In some embodiments, the apparatus and the like may be interpreted as physical or virtual, and names thereof are not limited to names described in embodiments, and terms "apparatus", "equipment", "device", "circuit", "network element", "node", "function", "unit", "section", "system", "network", "chip", "chip system", "entity", "subject" and the like may be substituted for each other.

In some embodiments, the "network" may be interpreted as an apparatus included in the network (e.g. the access network device, the core network device, etc.).

In some embodiments, terms "access network device (AN device)", "radio access network device (RAN device)", "base station (BS)", "radio base station", "fixed station", "node", "access point", "transmission point (TP)", "reception point (RP)", "transmission/reception point (TRP)", "panel", "antenna panel", "antenna array", "cell", "macro cell", "small cell", "femto cell", "pico cell", "sector", "cell group", "serving cell", "carrier", "component carrier", "bandwidth part (BWP)" and the like may be substituted for each other.

In some embodiments, terms "terminal", "terminal device", "user equipment (UE)", "user terminal", "mobile station (MS)", "mobile terminal (MT)", "subscriber station", "mobile unit", "subscriber unit", "wireless unit", "remote unit", "mobile device", "wireless device", "wireless communication device", "remote device", "mobile subscriber station", "access terminal", "mobile terminal", "wireless terminal", "remote terminal", "handset", "user agent", "mobile client", "client" and the like may be substituted for each other.

In some embodiments, terms "codebook", "codeword", "precoding matrix", and the like may be substituted for each other. For example, the codebook may be a union of one or more codewords/precoding matrices.

In some embodiments, names of the information and the like are not limited to the names described in embodiments. Terms "information", "message", "signal", "signaling", "report", "configuration", "indication", "instruction", "command", "channel", "parameter", "field", "field", "symbol", "symbol", "codebook", "codeword", "codepoint", "bit", "data", "program" "chip", and the like may be substituted for each other.

In some embodiments, the data, information, etc. may be obtained in compliance with local country laws and regulations.

In some embodiments, the data, information, etc. may be obtained upon the consent of the user.

In the above embodiments, the present disclosure may be implemented in whole or in part by the hardware, software, firmware or their combination. When implemented in the software, the present disclosure may be implemented in whole or in part as the computer program product. The computer program product includes one or more computer programs. The computer programs, when loaded and executed on the computer, result in whole or in part in processes or functions according to embodiments of the present disclosure. The computer may be a general-purpose computer, a special-purpose computer, a computer network, or other programmable devices. The computer program may be stored in a computer-readable storage medium or transmitted from one computer-readable storage medium to another, for example, the computer program may be transmitted from one website, computer, server, or data center to another website, computer, server, or data center by wire (e.g. coaxial cable, fiber optic, digital subscriber line (DSL)) or wirelessly (e.g. infrared, wireless, microwave, etc.). The computer-readable storage medium may be any available medium that may be accessed by the computer or a data storage device, such as a server, a data center, etc., that includes one or more available media. The available medium may be a magnetic medium (e.g. a floppy disk, a hard disk, a magnetic tape), an optical medium (e.g. a high-density digital video disc (DVD)), or a semiconductor medium (e.g. a solid state disk (SSD)), etc.

Those skilled in the art may appreciate that units and algorithm steps of each example described in conjunction with embodiments disclosed herein may be implemented with the electronic hardware, or combinations of the computer software and the electronic hardware. Whether such functionality is implemented in hardware or software depends on the specific application and design constraints of the technical solution. Those skilled in the art may implement the described functionality in varying ways for each particular application, but such implementation should not be considered to be beyond the scope of the present disclosure.

It will be clear to those skilled in the art that, for convenience and brevity of the description, specific working procedures of the above described systems, devices and units may be referred to corresponding procedures in the preceding method embodiments and will not be described in detail here.

The above description is only for the specific embodiments of the present disclosure, but the scope of the present disclosure is not limited thereto. Any person skilled in the art may easily think of changes or substitutions within the technical scope of the present disclosure, which shall be covered by the protection scope of the present disclosure. Therefore, the protection scope of the present application shall be in line with the attached claims.

What is claimed is:

1. A cell handover method, applied to a first network device, comprising:
    determining a first stereo cell where a spatial terminal is located based on first position information where the spatial terminal is located;
    determining a second stereo cell to be switched for the spatial terminal based on second position information where the spatial terminal is located after a time period and a cell handover strategy; and sending a handover message to the spatial terminal to indicate the spatial terminal to switch from the first stereo cell to the second stereo cell.

2. The cell handover method of claim 1, wherein the method further comprises:
   obtaining the first position information and motion state information from the spatial terminal; and
   determining the second position information based on the first position information and the motion state information.

3. The cell handover method of claim 2, wherein the first position information comprises a first position coordinate in an earth coordinate system;
   the second position information comprises a second position coordinate in the earth coordinate system; the second position information is obtained by converting a displacement of the spatial terminal in an inertial coordinate system after the time period based on a first transformation matrix from the inertial coordinate system to the earth coordinate system;
   the displacement is obtained based on a third position coordinate of the spatial terminal in the inertial coordinate system, a running speed and a triaxial acceleration;
   the triaxial acceleration and the running speed are obtained based on the motion state information; and
   the third position coordinate is obtained by converting the first position coordinate based on a second transformation matrix from the earth coordinate system to the inertial coordinate system.

4. The cell handover method of claim 1, wherein heights of the first stereo cell and the second stereo cell are different, and the handover message carries codeword information corresponding to the height where the second stereo cell is located to indicate the spatial terminal to perform cell handover based on the codeword information.

5. The cell handover method of claim 4, wherein a codeword corresponding to a height where the first stereo cell is located and a codeword corresponding to a height where the second stereo cell is located are mutually orthogonal or mutually quasi-orthogonal.

6. The cell handover method of claim 1, wherein the first stereo cell and the second stereo cell are covered by different beams, and the handover message carries relevant information about a beam covering the second stereo cell to indicate the spatial terminal to perform the cell handover based on the relevant information about the beam.

7. The cell handover method of claim 1, wherein the method further comprises:
   sending a first handover negotiation message to a second network device in case that the second stereo cell is within a coverage range of the second network device, wherein the first handover negotiation message carries an identifier of the second stereo cell to indicate the second network device to reserve a service resource for the second stereo cell.

8. The cell handover method of claim 1, wherein the method further comprises:
   reserving a service resource for the second stereo cell in case that the second stereo cell is within a coverage range of the first network device, and the first network device has a capability of providing a service resource for the second stereo cell.

9. The cell handover method of claim 1, wherein the method further comprises:
   determining a third stereo cell to be switched by the spatial terminal in case that the second stereo cell is within a coverage range of the first network device, and the first network device does not have a capability of providing a service resource for the second stereo cell, wherein the third stereo cell is within a coverage range of a third network device; and
   sending a second handover negotiation message to the third network device, wherein the second handover negotiation message carries an identifier of the third stereo cell to indicate the third network device to reserve a service resource for the third stereo cell.

10. A cell handover method, applied to a spatial terminal, comprising:
    receiving a handover message from a network device; and
    switching from a first stereo cell where the spatial terminal is located to a second stereo cell based on the handover message;
    wherein the first stereo cell is determined by the network device based on first position information where the spatial terminal is located, and the second stereo cell is determined by the network device based on second position information where the spatial terminal is located after a time period and a cell handover strategy.

11. The cell handover method of claim 10, wherein the method further comprises:
    sending the first position information to the network device.

12. The cell handover method of claim 10, wherein the method further comprises:
    sending the first position information and motion state information to the network device, wherein the first position information and the motion state information are configured to determine the second position information.

13. The cell handover method of claim 10, wherein heights of the first stereo cell and the second stereo cell are different, and the handover message carries codeword information corresponding to the height where the second stereo cell is located; and
    switching from the first stereo cell where the spatial terminal is located to the second stereo cell based on the handover message comprises:
        switching from the first stereo cell to the second stereo cell based on the codeword information.

14. The cell handover method of claim 10, wherein the first stereo cell and the second stereo cell are covered by different beams, and the handover message carries relevant information about a beam covering the second stereo cell; and
    switching from the first stereo cell where the spatial terminal is located to the second stereo cell based on the handover message comprises:
        switching from the first stereo cell to the second stereo cell based on the relevant information about the beam.

15. A cell handover device, applied to a first network device, comprising:
    a processor configured to determine a first stereo cell where a spatial terminal is located based on first position information where the spatial terminal is located, and determine a second stereo cell to be switched for the spatial terminal based on second position information where the spatial terminal is located after a time period and a cell handover strategy; and a transceiver configured to send a handover message to the spatial terminal to indicate the spatial terminal to switch from the first stereo cell to the second stereo cell.

16. A cell handover device, applied to a spatial terminal, comprising:
   a transceiver configured to receive a handover message from a network device; and
   a processor configured to switch from a first stereo cell where the spatial terminal is located to a second stereo cell based on the handover message;
   wherein the first stereo cell is determined by the network device based on first position information where the spatial terminal is located, and the second stereo cell is determined by the network device based on second position information where the spatial terminal is located after a time period and a cell handover strategy.

17. A network device, comprising:
   one or more processors; and
   one or more memories for storing instructions;
   wherein the processor is configured to invoke the instructions to enable the network device to perform the cell handover method according to claim 1.

18. A spatial terminal, comprising:
   one or more processors; and
   one or more memories for storing instructions;
   wherein the processor is configured to invoke the instructions to enable the spatial terminal to perform the cell handover method according to claim 10.

19. A communication system, comprising a network device and a spatial terminal, wherein the network device is configured to implement the following cell handover method:
   determining a first stereo cell where a spatial terminal is located based on first position information where the spatial terminal is located;
   determining a second stereo cell to be switched for the spatial terminal based on second position information where the spatial terminal is located after a time period and a cell handover strategy; and
   sending a handover message to the spatial terminal to indicate the spatial terminal to switch from the first stereo cell to the second stereo cell; and
   the spatial terminal is configured to implement the cell handover method according to claim 10.

20. A non-transitory storage medium storing instructions that, when executed on a communication device, enable the communication device to perform the following cell handover method:
   determining a first stereo cell where a spatial terminal is located based on first position information where the spatial terminal is located;
   determining a second stereo cell to be switched for the spatial terminal based on second position information where the spatial terminal is located after a time period and
   a cell handover strategy; and
   sending a handover message to the spatial terminal to indicate the spatial terminal to switch from the first stereo cell to the second stereo cell; or
   to perform the cell handover method according to claim 10.

* * * * *